(12) United States Patent
Zhao

(10) Patent No.: US 12,075,509 B2
(45) Date of Patent: Aug. 27, 2024

(54) RESOURCE ALLOCATION METHOD AND DEVICE

(71) Applicant: DATANG MOBILE COMMUNICATIONS EQUIPMENT CO., LTD., Beijing (CN)

(72) Inventor: Yali Zhao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 631 days.

(21) Appl. No.: 17/264,287

(22) PCT Filed: Jul. 15, 2019

(86) PCT No.: PCT/CN2019/096002
§ 371 (c)(1),
(2) Date: Jan. 28, 2021

(87) PCT Pub. No.: WO2020/034797
PCT Pub. Date: Feb. 20, 2020

(65) Prior Publication Data
US 2021/0307106 A1    Sep. 30, 2021

(30) Foreign Application Priority Data
Aug. 16, 2018 (CN) .......................... 20180934936.X

(51) Int. Cl.
*H04W 76/27* (2018.01)
*H04W 76/14* (2018.01)
*H04W 92/18* (2009.01)

(52) U.S. Cl.
CPC ........... *H04W 76/27* (2018.02); *H04W 76/14* (2018.02); *H04W 92/18* (2013.01)

(58) Field of Classification Search
CPC ...... H04W 76/27; H04W 76/14; H04W 92/18
(Continued)

(56) References Cited

U.S. PATENT DOCUMENTS

2010/0144357 A1* 6/2010 Chaudhri .......... H04W 52/0238
455/450
2011/0310769 A1* 12/2011 Lee .......................... H04L 67/12
370/254
(Continued)

FOREIGN PATENT DOCUMENTS

CN        104410975 A      3/2015
CN        104540236 A      4/2015
(Continued)

OTHER PUBLICATIONS

3GPP TS 36.331 V13.10.0, 3rd Generation Partnership Project; Technical Specification Group Radio Access Network; Evolved Universal Terrestrial Radio Access (E-UTRA); Radio Resource Control (RRC); Protocol specification (Release 13), total 645 pages, Jun. 2018.
(Continued)

*Primary Examiner* — Mark G. Pannell
(74) *Attorney, Agent, or Firm* — Kilpatrick Townsend & Stockton LLP

(57) ABSTRACT

Disclosed are a resource allocation method and device, used for solving the problem that an RRC IDLE state terminal or an RRC INACTIVE state terminal cannot obtain a sidelink transmission resource in an NR system. In the present application, when a terminal has a data transmission demand on a sidelink, whether a sidelink transmission resource exists is determined; when determining that no sidelink transmission resource exists, the terminal initiates an RRC connection management related procedure or a system information request procedure to obtain a sidelink transmission resource, so that data transmission may be performed on the obtained sidelink transmission resource. Therefore, a specific solution is given: in the NR system, when the terminal has a data transmission demand but no sidelink transmission
(Continued)

resource is available, obtaining a sidelink transmission resource to implement sidelink data transmission.

18 Claims, 3 Drawing Sheets

(58) Field of Classification Search
USPC .......................................................... 370/310
See application file for complete search history.

(56) References Cited

U.S. PATENT DOCUMENTS

| | | | | |
|---|---|---|---|---|
| 2012/0015607 | A1* | 1/2012 | Koskela | H04W 76/14 |
| | | | | 455/62 |
| 2013/0308551 | A1* | 11/2013 | Madan | H04W 72/20 |
| | | | | 370/329 |
| 2015/0045018 | A1* | 2/2015 | Liu | H04W 76/14 |
| | | | | 455/426.1 |
| 2015/0222401 | A1* | 8/2015 | Xu | H04W 8/005 |
| | | | | 370/329 |
| 2015/0264733 | A1* | 9/2015 | Guo | H04W 76/27 |
| | | | | 370/329 |
| 2015/0271786 | A1* | 9/2015 | Xue | H04W 74/0816 |
| | | | | 370/329 |
| 2015/0327312 | A1* | 11/2015 | Burbidge | H04W 72/23 |
| | | | | 370/329 |
| 2016/0157172 | A1* | 6/2016 | Jeong | H04W 76/14 |
| | | | | 370/329 |
| 2016/0212793 | A1* | 7/2016 | Jung | H04W 76/14 |
| 2016/0255458 | A1* | 9/2016 | Huang | H04W 4/70 |
| | | | | 370/338 |
| 2016/0255554 | A1* | 9/2016 | Ke | H04W 12/06 |
| | | | | 455/436 |
| 2016/0323869 | A1 | 11/2016 | Xu et al. | |
| 2017/0105236 | A1* | 4/2017 | Chandramouli | H04W 76/10 |
| 2017/0156175 | A1 | 6/2017 | Kim et al. | |
| 2017/0317740 | A1* | 11/2017 | Basu Mallick | H04W 8/005 |
| 2017/0331670 | A1* | 11/2017 | Parkvall | H04W 24/10 |
| 2018/0152940 | A1* | 5/2018 | Bagheri | H04W 72/21 |
| 2020/0053553 | A1* | 2/2020 | Adachi | H04W 4/40 |
| 2021/0385694 | A1* | 12/2021 | Freda | H04W 74/0816 |

FOREIGN PATENT DOCUMENTS

| | | |
|---|---|---|
| CN | 106256166 A | 12/2016 |
| EP | 3346782 A1 | 7/2018 |
| KR | 20130065253 A | 6/2013 |
| KR | 1020140122178 A | 10/2014 |
| KR | 1020160119843 A | 10/2016 |
| WO | 2016074201 A1 | 5/2016 |

OTHER PUBLICATIONS

ZTE, "Discussion on LTE/NR Uu based resource allocation/configuration for NR sidelink", 3GPP TSG RAN WG1 Meeting #94, Gothenburg, Sweden, Aug. 20-24, 2018, total 3 pages, R1-1808606.
Intel, "Stage 3 RRC TP on RRC_Inactive state for E-UTRA connected to 5GC", 3GPP TSG-RAN2 Meeting #102 Busan, Korea, May 21-25, 2018, total 62 pages, R2-1807362.

* cited by examiner

RESOURCE ALLOCATION METHOD AND DEVICE

CROSS-REFERENCE OF RELATED APPLICATIONS

The present application is a national phase entry under 35 U.S.C. § 371 of International Application No. PCT/CN2019/096002, filed on Jul. 15, 2019, which claims the priority from Chinese Patent Application No. 201810934936.X, filed on Aug. 16, 2018, in the China National Intellectual Property Administration and entitled "Resource Allocation Method and Device", which is hereby incorporated by reference in its entirety.

FIELD

The present application relates to the field of communication technology, and in particular to a resource allocation method and device.

BACKGROUND

In the Long Term Evolution (LTE) system, the devices that are close to each other are allowed to perform sidelink communications. The devices of the sidelink communications may be all on the network or off the network, or some devices are on the network and some devices are off the network. For a terminal on the network, the sidelink supports two resource allocation modes:
  resource allocation mode of network scheduling: the network allocates specific time/frequency-domain resources for sidelink transmission to the sending terminal of sidelink communication;
  resource allocation mode of terminal self-selection: a resource pool used for sidelink transmission is pre-configured, or configured by the network, and the terminal can select resources used for sidelink transmission in the transmission resource pool by itself.

In the LTE system, there are terminals in the Radio Resource Control Idle (RRC IDLE) state and terminals in the Radio Resource Control Connected (RRC Connected) state. For a terminal in the RRC IDLE state, the behavior that the sidelink has data reaching the terminal is: the terminal in the RRC IDLE state reads the System Information Block (SIB) related to the sidelink.

If the SIB contains a sidelink transmission resource pool, the resource allocation mode of terminal self-selection is selected for use, and resources are selected from the sidelink transmission resource pool for the sidelink to perform the data transmission;

If the SIB does not contain a sidelink transmission resource pool, the Radio Resource Control (RRC) connection establishment procedure needs to be initiated, and the network determines the resource allocation mode used by the sidelink. If the resource allocation mode of terminal self-selection is used, the related resource pool information will also be configured.

To sum up, there is only the solution of sidelink communication of the terminal in the RRC IDLE state under the LTE system in the prior art, but there is no solution for the terminal in the RRC IDLE state or the terminal in the Radio Resource Control Inactive (RRC INACTIVE) state to obtain sidelink transmission resources under the New Radio (NR).

BRIEF SUMMARY

The present application provides a resource allocation method and device, to solve the problem in the prior art that the terminal in the RRC IDLE state or the terminal in the RRC INACTIVE state cannot obtain sidelink transmission resources in the NR system.

In a first aspect, an embodiment of the present application provides a resource allocation method, which includes:
  determining, by a terminal, whether there is a sidelink transmission resource, when a sidelink has a data transmission requirement;
  obtaining, by the terminal, a sidelink transmission resource by initiating an RRC connection management related procedure or a system information request procedure, when there is no sidelink transmission resource.

In the above method, when the sidelink of the terminal has a data transmission requirement, the terminal will judge whether there is a sidelink transmission resource, and the terminal initiates an RRC connection management related procedure or a system information request procedure to obtain one or more sidelink transmission resources when determining that there is no sidelink transmission resource, and thus the data transmission can be performed on the obtained sidelink transmission resource(s), and a specific scheme is provided to realize the sidelink data transmission by obtaining sidelink transmission resource(s) when the terminal has a data transmission requirement but no sidelink transmission resource is available in the NR system.

In a possible implementation, the terminal is in the RRC IDLE state or in the RRC INACTIVE state.

In the above method, the RRC state of the terminal in the NR system is provided as RRC IDLE state or RRC INACTIVE state, thus the RRC state of the terminal in the embodiment of the present application is further indicated.

In a possible implementation, when the terminal determines whether there is a sidelink transmission resource, the terminal reads a currently-broadcast system information, and when there is system information that is being broadcast and carries a sidelink transmission resource, determines that there is a sidelink transmission resource; otherwise, determines that there is no sidelink transmission resource; or
  the terminal determines whether previously-stored system information carrying a sidelink transmission resource is available, according to a system information area identifier and a system information validity identifier carried in a system information block 1 of a current cell; if so, determines that there is a sidelink transmission resource; otherwise, determines that there is no sidelink transmission resource; or
  the terminal determines whether previously-stored system information carrying a sidelink transmission resource is available, according to a system information area identifier and a system information validity identifier carried in a system information block 1 of a current cell; if so, determines that there is a sidelink transmission resource; otherwise, the terminal reads a currently-broadcast system information, and when there is system information that is being broadcast and carries a sidelink transmission resource, determines that there is a sidelink transmission resource; otherwise, determines that there is no sidelink transmission resource; or
  the terminal reads a currently-broadcast system information, and when there is system information that is being broadcast and carries a sidelink transmission resource, determines that there is a sidelink transmission resource; otherwise, the terminal determines whether previously-stored system information carrying a sidelink transmission resource is available according to a system information area identifier and a system information validity identifier carried in a system information block 1 of a current cell; if so, determines that there is a sidelink transmission resource; otherwise, determines that there is no sidelink transmission resource.

The above content provides the methods of judging whether there is a sidelink transmission resource when the direct communication of the terminal has a data transmission requirement. The terminal can directly perform data transmission when there is a sidelink transmission resource, saving the information transmission time and resources for obtaining sidelink transmission resources. There is a need to obtain sidelink transmission resource(s) only when there is no sidelink transmission resource, so that the terminal with data transmission requirement can normally send the data on the sidelink.

In a possible implementation, before the terminal initiates the RRC connection management related procedure or system information request procedure to obtain a sidelink transmission resource, the terminal determines a procedure for obtaining a sidelink transmission resource according to protocol agreement; or
  the terminal determines a procedure for obtaining a sidelink transmission resource according to its own implementation; or
  the terminal determines a procedure for obtaining a sidelink transmission resource according to indication information of a network-side device;
  where the procedure for obtaining a sidelink transmission resource is the RRC connection management related procedure or system information request procedure.

The above method provides three implementations of how the terminal determines whether to use the RRC connection management related procedure or the system information request procedure to obtain one or more sidelink transmission resources, making this solution more complete.

In a possible implementation, the protocol stipulates that the terminal only uses the RRC connection management related procedure; or the protocol stipulates that the terminal only uses the system information request procedure.

The above method clearly provides that the terminal can directly determine whether to use the RRC connection management related procedure or the system information request procedure according to the protocol agreement, making the solution where the terminal determines the procedure for obtaining sidelink transmission resource(s) according to the protocol agreement more complete.

In a possible implementation, the terminal determines the procedure for obtaining a sidelink transmission resource according to its own implementation, and the terminal determines the procedure for obtaining a sidelink transmission resource according to Quality of Service (QoS) parameters of a sidelink service and/or signaling overheads used for acquiring a sidelink transmission resource.

The above method clearly provides that it is mainly based on the QoS parameters of the sidelink service and/or the signaling overheads used for acquiring a sidelink transmission resource(s) when the terminal determines whether to use the RRC connection management related procedure or the system information request procedure according to its own implementation, where the QoS parameters of the sidelink service and/or the signaling overheads used for acquiring a sidelink transmission resource(s) may be determined by the terminal itself, thus, the solution of determining the procedure for obtaining sidelink transmission resource(s) according to its own implementation is further provided.

In a possible implementation, when the terminal determines the procedure for obtaining a sidelink transmission resource according to the indication information of the network-side device, and when the indication information of the network-side device indicates that system information related to sidelink communication of a current cell contains indication information of a sidelink transmission resource pool, or indicates that system information related to sidelink communication of a current cell does not contain indication information of a sidelink transmission resource pool, the terminal determines the procedure for obtaining a sidelink transmission resource according to the indication information of the network-side device; or
  when the indication information of the network-side device indicates a procedure to be initiated by the terminal for obtaining a sidelink transmission resource, the terminal determines the procedure for obtaining a sidelink transmission resource according to the indication information of the network-side device; or
  when the indication information of the network-side device includes a correspondence between QoS parameters and a procedure for obtaining a sidelink transmission resource, or includes a correspondence between a QoS parameter combination and a procedure for obtaining a sidelink transmission resource, the terminal determines the procedure for obtaining a sidelink transmission resource, according to QoS parameters or a QoS parameter combination corresponding to a logical channel with data transmission requirement of the sidelink, as well as the indication information of the network-side device; or
  when the indication information of the network-side device includes thresholds of QoS parameters or a threshold of a QoS parameter combination corresponding to a procedure for obtaining a sidelink transmission resource, the terminal determines the procedure for obtaining a sidelink transmission resource according to QoS parameters or a parameter combination corresponding to a logical channel with data transmission requirement of the sidelink, as well as the indication information of the network-side device.

The above method clearly provides the specific content of the indication information sent by the network-side device, when the terminal determines whether to use the RRC connection management related procedure or the system information request procedure according to the indication information of the network-side device, so that the terminal determines the procedure for obtaining sidelink transmission resource(s) according to the indication information more accurately.

In a possible implementation, when the sidelink has a plurality of logical channels with data transmission requirements, the terminal determines a logical channel with the highest priority as the logical channel with data transmission requirement.

In the above method, since the sidelink has a plurality of logical channels with data transmission requirements, the logical channel with the highest priority is selected as the logical channel with data transmission requirement, so that the QoS requirement of the high-priority data can be guaranteed preferentially.

In a possible implementation, when the indication information of the network-side device indicates that system information related to sidelink communication of a current cell contains indication information of a sidelink transmission resource pool, or indicates that system information related to sidelink communication of a current cell does not contain indication information of a sidelink transmission resource pool, the terminal determines the procedure for obtaining a sidelink transmission resource according to the indication information of the network-side device, and when the indication information of the network-side device indicates that the system information related to sidelink of the current cell contains the indication information of the sidelink transmission resource pool, the terminal determines the procedure for obtaining a sidelink transmission resource pool as a system information request procedure; or when the indication information of the network-side device indicates that the system information related to sidelink communication of the current cell does not contain the indication information of the sidelink transmission resource pool, the terminal determines the procedure for obtaining a sidelink transmission resource pool as an RRC connection management related procedure.

In the above method, when the terminal determines the procedure for obtaining sidelink transmission resource(s) according to the indication information of the network-side device, and when the indication information is the system information related to sidelink communication of the current cell, whether to use the system information request procedure or the RRC connection management related procedure is determined on the basis of whether the system information related to sidelink communication of the current cell contains the sidelink transmission resource pool, which clearly provides that the system information request procedure is used if the system information related to sidelink communication of the current cell contains the sidelink transmission resource pool; otherwise the RRC connection management related procedure is used, so that the terminal determines the procedure for obtaining sidelink transmission resource(s) more accurately in the embodiment of the present application.

In a possible implementation, before the terminal determines the procedure for obtaining a sidelink transmission resource according to the indication information of the network-side device, the terminal receives the indication information of the network-side device through a target message;

where when the terminal is in the RRC INACTIVE state, the target message is at least one of: Radio Resource Control Resume (RRC Resume) message, Master Information Block (MIB), System Information Block 1 (SIB1), Radio Access Network-level Paging (RAN-level Paging);

where when the terminal is in the RRC IDLE state, the target message is at least one of: MIB, SIB1, RAN-level Paging.

In the above method, the terminal should firstly receive the indication information sent by the network-side device before determining the procedure for obtaining sidelink transmission resource(s) according to the indication information of the network-side device. The target message bearing the indication information is specifically indicated above, so that the indication information of the network-side device can be accurately sent to the terminal, and ensuring that the terminal can determine the procedure for obtaining sidelink transmission resource(s) according to the indication information of the network-side device.

In a possible implementation, after the terminal initiates the system information request procedure, when there is no available sidelink transmission resource in system information related to sidelink communication obtained by the terminal through the system information request procedure, the terminal obtains the sidelink transmission resource by initiating the RRC connection management related procedure.

The above method provides that the terminal obtains the system information related to sidelink communication according to the system information request procedure and determines whether there is an available sidelink transmission resource in the obtained system information related to sidelink communication, and when there is no available sidelink transmission resource, the terminal needs to re-acquire sidelink transmission resource(s) to ensure that the sidelink data can be sent normally.

In a possible implementation, when the terminal is in the RRC INACTIVE state, the RRC connection management related procedure initiated by the terminal is an RRC connection resume procedure; or when the terminal is in the RRC IDLE state, the RRC connection management related procedure initiated by the terminal is an RRC connection establishment procedure.

The above method clearly indicates that the terminal in the RRC INACTIVE state corresponds to the RRC connection resume procedure and the terminal in the RRC IDLE state corresponds to the RRC connection establishment procedure. When the terminal in different states, the initiated RRC connection management related procedures are inconsistent, so that the solution of the present application is more detailed and specific.

In a second aspect, an embodiment of the present application provides a resource allocation method, which includes:

responding to, by a network-side device, an RRC connection management related procedure or a system information request procedure initiated by a terminal, where the RRC connection management related procedure or system information request procedure is initiated by the terminal, when a sidelink has a data transmission requirement and there is no available sidelink transmission resource;

allocating, by the network-side device, a sidelink transmission resource to the terminal through the RRC connection management related procedure or system information request procedure.

In the above method, the network-side device responds to the RRC connection management related procedure or system information request procedure initiated by the terminal, and allocates one or more sidelink transmission resources to the terminal according to the RRC connection management related procedure or system information request procedure, so that the terminal can obtain sidelink transmission resource(s) and send the data on the sidelink transmission resources.

In a possible implementation, before the network-side device responds to the RRC connection management related procedure or system information request procedure initiated by the terminal, the network-side device notifies the terminal of a procedure for obtaining a sidelink transmission resource through indication information;

where the procedure for obtaining a sidelink transmission resource is the RRC connection management related procedure or system information request procedure.

In the above method, the network-side device sends the indication information to the terminal and informs the terminal of the procedure for obtaining sidelink transmission resource(s) through the indication information.

In a possible implementation, the indication information indicates that system information related to sidelink communication of a current cell contains indication information of a sidelink transmission resource pool, or indicates that system information related to sidelink communication of a current cell does not contain indication information of a sidelink transmission resource pool; or the indication information indicates a procedure to be initiated by the terminal for obtaining a sidelink transmission resource; or the indication information includes a correspondence between QoS parameters and a procedure for obtaining a sidelink transmission resource, or comprises a correspondence between a QoS parameter combination and a procedure for obtaining a sidelink transmission resource;

the indication information includes thresholds of QoS parameters or a threshold of a QoS parameter combination corresponding to a procedure for obtaining a sidelink transmission resource.

The above method specifies the specific content of the indication information. Further, the terminal can determine the procedure for obtaining sidelink transmission resource(s) according to the above indication information. Since the content of the indication information is clarified, the terminal determines the procedure for obtaining sidelink transmission resource(s) according to the indication information more accurately.

In a possible implementation, when the network-side device notifies the terminal of the procedure for obtaining a sidelink transmission resource through the indication information, the network-side device sends the indication information through a target message;

where when the terminal is in the RRC INACTIVE state, the target message is at least one of: RRC Resume message, MIB, SIB1, RAN-level Paging;

when the terminal is in the RRC IDLE state, the target message is at least one of MIB, SIB1, RAN-level Paging.

In the above method, the bearer information used by the network side for sending the indication information is provided, ensuring that the network-side device can send the indication information to the terminal smoothly, and thus the terminal can determine the procedure used for obtaining sidelink transmission resource(s) according to the indication information of the network-side device.

In a possible implementation, when the terminal is in the RRC INACTIVE state, the RRC connection management related procedure performed by the network-side device and terminal is an RRC connection resume procedure; or when the terminal is in the RRC IDLE state, the RRC connection management related procedure performed by the network-side device and terminal is an RRC connection establishment procedure.

In the above method, when the terminal is a terminal in the RRC INACTIVE state, the network-side device responds to the RRC connection resume procedure of the terminal; and when the terminal is a terminal in the RRC IDLE state, the network-side device responds to the RRC connection establishment procedure of the terminal. The RRC connection management related procedures between different terminals and the network-side device are different. According to specific embodiments, the terminal in the NR system may be a terminal in the RRC INACTIVE state or a terminal in the RRC IDLE state.

In a third aspect, an embodiment of the present application provides a resource allocation device, which includes: a processor, a memory and a transceiver;

where the processor is configured to read a program in the memory and perform a method of:

determining whether there is a sidelink transmission resource when a sidelink has a data transmission requirement; and obtaining a sidelink transmission resource by initiating an RRC connection management related procedure or a system information request procedure, when there is no sidelink transmission resource.

In a fourth aspect, an embodiment of the present application provides a resource allocation device, which includes: a processor, a memory and a transceiver;

where the processor is configured to read a program in the memory and perform a method of:

responding to an RRC connection management related procedure or a system information request procedure initiated by a terminal, where the RRC connection management related procedure or system information request procedure is initiated by the terminal when a sidelink has a data transmission requirement and there is no available sidelink transmission resource; and allocating a sidelink transmission resource to the terminal through the RRC connection management related procedure or system information request procedure.

In a fifth aspect, an embodiment of the present application provides a resource allocation device, which includes:

a determination device configured to determine whether there is a sidelink transmission resource, when a sidelink has a data transmission requirement;

an initiation device configured to obtain a sidelink transmission resource by initiating an RRC connection management related procedure or a system information request procedure, when there is no sidelink transmission resource.

In a sixth aspect, an embodiment of the present application provides a resource allocation device, which includes:

a respond device configured to respond to an RRC connection management related procedure or a system information request procedure initiated by a terminal, where the RRC connection management related procedure or system information request procedure is initiated by the terminal, when a sidelink has a data transmission requirement and there is no available sidelink transmission resource;

an allocation device configured to allocate a sidelink transmission resource to the terminal through the RRC connection management related procedure or system information request procedure.

In a seventh aspect, a computer storage medium provided by an embodiment of the present application stores a computer program thereon, where the program, when executed by a processor, implements the method for the terminal to obtain a sidelink transmission resource or implements the method for the network-side device to allocate a sidelink transmission resource to the terminal.

BRIEF DESCRIPTION OF THE DRAWINGS

In order to illustrate embodiments of the present application more clearly, the accompanying figures which need to be used in describing the embodiments will be introduced below briefly. Obviously the accompanying figures described below are only some embodiments of the present application.

DETAILED DESCRIPTION OF THE EMBODIMENTS

Figure 1:
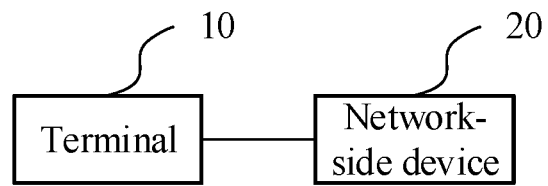
FIG. 1 is a structural schematic diagram of a resource allocation system provided by an embodiment of the present application.

In the following, some terms in the embodiments of the present application are explained to facilitate the understanding.

(1) In the embodiments of the present application, the nouns "network" and "system" are often used alternately.

(2) The term "a plurality of" in the embodiments of the present application refers to two or more, and other quantifiers are similar thereto.

(3) "and/or" describes the association relationship of the associated objects, and indicates that there may be three relationships, for example, A and/or B may represent: only A, both A and B, and only B. The character "/" generally indicates that the associated objects have a kind of "or" relationship.

In the LTE system, the devices that are close to each other are allowed to perform sidelink communications. The devices of the sidelink communications may be all on the network or off the network, or some devices are on the network and some devices are off the network.

At present, in the LTE system, there are terminals in the RRC IDLE state and terminals in the RRC Connected state; and for a terminal in the RRC IDLE state, the behavior that the sidelink has data reaching the terminal is: the terminal in the RRC IDLE state reads the SIB related to the sidelink.

If the SIB contains a sidelink transmission resource pool, the resource allocation mode of terminal self-selection is selected for use, and resources are selected from the sidelink transmission resource pool to perform the data transmission of sidelink.

If the SIB does not contain a sidelink transmission resource pool, the RRC connection establishment procedure needs to be initiated, and the network determines the resource allocation mode used by the sidelink. If the resource allocation mode of terminal self-selection is used, the related resource pool information will also be configured.

As can be seen from the above, there is only the solution of sidelink communication of the terminal in the RRC IDLE state under the LTE system in the prior art, but there is no solution for the terminal in the RRC IDLE state or the terminal in the RRC INACTIVE state to obtain sidelink transmission resources under the NR.

Therefore, embodiments of the present application provide a method under the NR system: when the sidelink of the terminal has a data transmission requirement, the terminal firstly judges whether there are sidelink transmission resources at present, uses the sidelink transmission resources for data transmission directly when determining that there are sidelink transmission resources; and initiates the procedure for obtaining the sidelink transmission resources when determining that there is no sidelink transmission resource, to obtain the sidelink transmission resources and use the sidelink resources obtained by the procedure for data transmission, where the terminal is a terminal in the RRC IDLE state or a terminal in the RRC INACTIVE state.

Here, the terminal is a device with the wireless communication function, and can be deployed on land, including indoor or outdoor, handheld or vehicle-mounted; or can also be deployed on the water (such as ship, etc.); or can also be deployed in the air (e.g., on the airplane, balloon and satellite, etc.). The terminal may be: mobile phone, Pad, computer with wireless transceiver function, Virtual Reality (VR) terminal, Augmented Reality (AR) terminal, wireless terminal in the industrial control, wireless terminal in the self driving, wireless terminal in the remote medical, wireless terminal in the smart grid, wireless terminal in the transportation safety, wireless terminal in the smart city, wireless terminal in the smart home, etc.; or may be various forms of UE, Mobile Station (MS), terminal device.

The network-side device is a device that provides the wireless communication function for the terminal, including but not limited to: gNB in 5G, Radio Network Controller (RNC), Node B (NB), Base Station Controller (BSC), Base Transceiver Station (BTS), home base station (for example, home evolved NodeB or Home Node B (HNB)), Base Band Unit (BBU), Transmission and Reception Point (TRP), Transmitting Point (TP), mobile switching center, etc.

The present application will be further illustrated below in details with reference to the accompanying figures. The described embodiments are merely a part of the embodiments of the present application but not all the embodiments. Based upon the embodiments of the present application, all of other embodiments pertain to the protection scope of the present application.

In view of the foregoing scenario, a structural schematic diagram of a resource allocation system provided by the present application is specifically as shown in FIG. 1, where the system includes:

a terminal 10 for determining whether there is a sidelink transmission resource when a sidelink has a data transmission requirement; and initiating an RRC connection management related procedure or a system information request procedure to obtain sidelink transmission resource(s) if there is no sidelink transmission resource;

a network-side device 20 for responding to an RRC connection management related procedure or a system information request procedure initiated by a terminal, where the RRC connection management related procedure or system information request procedure is initiated by the terminal, when a sidelink has a data transmission requirement and there is no available sidelink transmission resource; and allocating sidelink transmission resource(s) to the terminal through the RRC connection management related procedure or system information request procedure.

In some embodiments of the present application, when the sidelink of the terminal has a data transmission requirement, the terminal will determine whether there is a sidelink transmission resource, and the terminal initiates an RRC connection management related procedure or a system information request procedure to obtain the sidelink transmission resource(s) when determining that there is no sidelink transmission resource. Thus the data transmission can be performed on the obtained sidelink transmission resource(s), and a specific scheme is provided to achieve the sidelink data transmission by obtaining sidelink transmission resource(s) when the terminal has a data transmission requirement but no sidelink transmission resource is available in the NR system.

Here, the terminal is a terminal in the RRC IDLE state or a terminal in the RRC INACTIVE state.

When the sidelink has a data transmission requirement, the terminal firstly determines whether a sidelink transmission resource is available; if it is determined that there is a sidelink transmission resource, the terminal performs data transmission on the determined sidelink transmission resource(s); and if there is no sidelink transmission resource, the terminal will initiate an RRC connection management related procedure or a system information request procedure to obtain sidelink transmission resource(s).

In some embodiments of the present application, the terminal mainly determines whether there is a sidelink transmission resource in the following ways.

In a first way: the terminal determines whether a sidelink transmission resource is available according to currently-broadcast system information.

In one embodiment, the terminal reads the currently-broadcast system information, and if there is system information that is being broadcast and carries sidelink transmission resource(s), determines that there is a sidelink transmission resource; otherwise, determines that there is no sidelink transmission resource.

Specifically, the terminal device may read the currently-broadcast system information, and determine whether the currently-broadcast system information carries the system information of sidelink transmission resource(s).

If the currently-broadcast system information includes the system information that is being broadcast and carries sidelink transmission resource(s), then it is determined that there is a sidelink transmission resource, and the terminal performs data transmission on the sidelink transmission resource(s) carried in the broadcast system information.

If there is no system information that is being broadcast and carries sidelink transmission resource(s) in the currently-broadcast system information, then it is determined that there is no sidelink transmission resource, and the terminal will initiate the RRC connection management related procedure or system information request procedure to obtain sidelink transmission resource(s).

In a second way: the terminal determines whether a sidelink transmission resource is available according to the information carried in the system information block 1 of the current cell.

In one embodiment, the terminal determines whether the previously-stored system information carrying sidelink transmission resource(s) is available according to a system information area identifier and a system information validity identifier carried in the system information block 1 of the current cell; if the previously-stored system information carrying sidelink transmission resource(s) is available, determines that there is a sidelink transmission resource; otherwise, determines that there is no sidelink transmission resource.

Specifically, a system information area identifier is stored in the terminal. After obtaining the system information area identifier and the system information validity identifier carried in the system information block 1 of the current cell, the terminal compares the system information area identifier carried in the system information block 1 with the system information area identifier stored by itself, and if they are consistent, determines whether the previously-stored system information carrying sidelink transmission resource(s) is available according to the system information validity identifier.

In some embodiments of the present application, after obtaining the message carried in the system information block 1 of the current cell, the terminal determines whether the obtained system information area identifier carried in the system information block 1 of the current cell is consistent with the system information area identifier stored by itself.

If they are inconsistent, it is determined that the previously-stored system information carrying sidelink transmission resource(s) is not available.

Or, if they are consistent, it is determined whether the system information of sidelink transmission resource(s) is available according to the obtained system information validity identifier carried in the system information block 1 of the current cell. If the system information validity identifier indicates that the system information carrying sidelink transmission resource(s) stored by the terminal previously is valid, it is determined that the previously-stored system information carrying sidelink transmission resource(s) is available; if invalid, it is determined that the previously-stored system information carrying sidelink transmission resource(s) is not available.

In a third way: the terminal determines whether a sidelink transmission resource is available according to a currently-broadcast system information after determining that there is no available sidelink transmission resource according to the information carried in the system information block of the current cell.

In one embodiment, the terminal determines whether the previously-stored system information carrying sidelink transmission resource(s) is available according to a system information area identifier and a system information validity identifier carried in the system information block 1 of the current cell; if so, determines that there is a sidelink transmission resource; otherwise, the terminal reads the currently-broadcast system information, and if there is system information that is being broadcast and carries sidelink transmission resource(s), determines that there is a sidelink transmission resource; otherwise, determines that there is no sidelink transmission resource.

In some embodiments of the present application, after obtaining the message carried in the system information block 1 of the current cell, the terminal determines whether the obtained system information area identifier carried in the system information block 1 of the current cell is consistent with the system information area identifier stored by itself.

If they are inconsistent, it is determined that the previously-stored system information carrying sidelink transmission resource(s) is not available.

Or, if they are consistent, it is determined whether the system information of sidelink transmission resource(s) is available according to the obtained system information validity identifier carried in the system information block 1 of the current cell. If the system information validity identifier indicates that the system information carrying sidelink transmission resource(s) stored by the terminal previously is valid, it is determined that the previously-stored system information carrying sidelink transmission resource(s) is available; if invalid, it is determined that the previously-stored system information carrying sidelink transmission resource(s) is not available, and the terminal reads the currently-broadcast system information.

After reading the currently-broadcast system information, the terminal determines whether the currently-broadcast system information carries sidelink transmission resource(s). If the currently-broadcast system information includes the system information that is being broadcast and carries sidelink transmission resources, the terminal determines that there is a sidelink transmission resource, and transmits the data on the sidelink transmission resource(s) carried in the broadcast system information.

Or, if there is no system information that is being broadcast and carries sidelink transmission resource(s) in the currently-broadcast system information, then it is determined that there is no sidelink transmission resource, and the terminal will initiate the RRC connection management related procedure or system information request procedure to obtain sidelink transmission resource(s).

In a fourth way: the terminal determines whether a sidelink transmission resource is available according to the information carried in the system information block of the current cell, after determining that there is no available sidelink transmission resource according to the currently-broadcast system information.

In one embodiment, the terminal reads the currently-broadcast system information. If there is system information that is being broadcast and carries sidelink transmission resource(s), the terminal determines that there is a sidelink transmission resource; otherwise, the terminal determines whether the previously-stored system information carrying sidelink transmission resource(s) is available according to a system information area identifier and a system information validity identifier carried in the system information block 1 of the current cell. If the previously-stored system information carrying sidelink transmission resource(s) is available, it is determined that there is a sidelink transmission resource; otherwise, it is determined that there is no sidelink transmission resource.

In some embodiments of the present application, the terminal reads the currently-broadcast system information, and determines whether the currently-broadcast system information carries the system information of sidelink transmission resource(s).

If the currently-broadcast system information includes the system information that is being broadcast and carries sidelink transmission resource(s), then it is determined that there is a sidelink transmission resource, and the terminal sends the data on the sidelink transmission resource(s) carried in the broadcast system information.

Or, if there is no system information that is being broadcast and carries sidelink transmission resource(s) in the currently-broadcast system information, then the terminal determines whether the obtained system information area identifier carried in the system information block 1 of the current cell is consistent with the system information area identifier stored by itself, after obtaining the message carried in the system information block 1 of the current cell.

If they are inconsistent, it is determined that the previously-stored system information carrying sidelink transmission resources is not available.

Or, if they are consistent, it is determined whether the system information of sidelink transmission resource(s) is available according to the obtained system information validity identifier carried in the system information block 1 of the current cell. If the system information validity identifier indicates that the system information carrying sidelink transmission resource(s) stored by the terminal previously is valid, it is determined that the previously-stored system information carrying sidelink transmission resource(s) is available; if invalid, it is determined that the previously-stored system information carrying sidelink transmission resource(s) is not available, and the terminal will initiate an RRC connection management related procedure or system information request procedure to obtain sidelink transmission resource(s).

Here, the system information area identifier is System Information Area Identifier, and the system information validity identifier is System Information Value Tag (system information version identifier) or System Information Configuration Index (system information configuration index).

In the implementations, a variety of ways are provided to determine whether a sidelink transmission resource is available for the terminal when the sidelink has a data transmission requirement. The transmission can be performed directly when a sidelink transmission resource is available, saving the time and resources of information transmission for obtaining sidelink transmission resources. The sidelink transmission resources are obtained when there is no sidelink transmission resource, so that the terminal with data transmission requirement can normally perform the transmission.

As can be seen from the above, when a sidelink transmission resource is available for the terminal, data is sent on the sidelink transmission resource(s); and when there is no sidelink transmission resource, it needs to obtain sidelink transmission resource(s) by initiating the RRC connection management related procedure or system information request procedure.

Specifically, whether the terminal device initiates the RRC connection management procedure or the system information request procedure is determined mainly according to protocol agreement or its own implementation or the indication information of the network device. For details, refer to the following embodiments.

First Embodiment: the terminal device determines the procedure used for obtaining sidelink transmission resources according to the protocol agreement.

Here, the procedure used for obtaining sidelink transmission resources is the RRC connection management related procedure or system information request procedure.

In some embodiments of the present application, when the terminal determines whether to use the RRC connection management related procedure or the system information request procedure to obtain sidelink transmission resources according to the protocol agreement, the protocol stipulates that the terminal can only use the RRC connection management related procedure, or the protocol stipulates that the terminal can only use the system information request procedure.

Case 1: the protocol stipulates that the terminal uses the RRC connection management related procedure.

When the terminal determines that the sidelink has a data transmission requirement, the terminal initiates an RRC connection management related procedure to the network-side device to obtain sidelink transmission resources.

Here, the sidelink data includes but not limited to: Device-to-Device (D2D) service data, Vehicle to Everything (V2X) service data, and other subsequently-introduced sidelink service data.

Specifically, the terminal is a terminal in the RRC IDLE state or a terminal in the RRC INACTIVE state. When the terminal is a terminal in the RRC IDLE state, the RRC connection management related procedure initiated by the terminal to the network-side device is an RRC connection establishment procedure.

Or, when the terminal is a terminal in the RRC INACTIVE state, the RRC connection management related procedure initiated by the terminal to the network-side device is an RRC connection resume procedure.

In one embodiment, if the terminal initiates an RRC connection establishment procedure, the terminal initiates a random access to the network-side device, and the random access information carries an RRC Connection Request message. After the RRC connection is established, the terminal sends a UE Sidelink Information (user sidelink information) message to the network-side device, to request the network-side device to determine the resource allocation mode on the sidelink for the terminal.

Correspondingly, the network-side device responds to the RRC connection establishment procedure initiated by the terminal, where the RRC connection establishment procedure is initiated by the terminal when a sidelink has a data transmission requirement and there is no available sidelink transmission resource.

The network-side device allocates sidelink transmission resources to the terminal through the RRC connection establishment procedure.

If the resource allocation mode of network scheduling is to be used, the network-side device sends specific resources of the sidelink to the terminal while determining the resource allocation mode to be used. Correspondingly, the terminal can use a Scheduling Request (SR) or Buffer Status Reporting (BSR) procedure to obtain the specific resources of the sidelink configured by the network-side device and send the data on the obtained specific resources.

Or, if the resource allocation mode of terminal self-selection is to be used, the network-side device allocates the transmission resource pool information to the terminal while determining the resource allocation mode to be used. Correspondingly, the terminal selects any transmission resource from the transmission resource pool information to send the data after receiving the transmission resource pool information allocated by the network-side device.

In one embodiment, if the terminal initiates an RRC connection resume procedure, the terminal sends an RRC Resume Request message to the network-side device; and after the RRC connection is resumed, the terminal sends a UE Sidelink Information message to the network-side device, to request the network-side device to determine the resource allocation mode on the sidelink for the terminal.

Correspondingly, the network-side device responds to the RRC connection resume procedure initiated by the terminal, where the RRC connection resume procedure is initiated by the terminal when a sidelink has a data transmission requirement and there is no available sidelink transmission resource.

The network-side device allocates sidelink transmission resources to the terminal through the RRC connection resume procedure.

If the resource allocation mode of network scheduling is used, the network-side device sends specific resources of the sidelink to the terminal. Correspondingly, the terminal can use the SB or BSR procedure to obtain the specific resources of the sidelink configured by the network-side device and send the data on the obtained specific resources.

Or, if the resource allocation mode of terminal self-selection is to be used, the network-side device allocates the transmission resource pool information to the terminal while determining the resource allocation mode to be used. Correspondingly, the terminal selects any transmission resource from the transmission resource pool information to send the data after receiving the transmission resource pool information allocated by the network-side device.

Case 2: the protocol stipulates that the terminal uses the system information request procedure.

In some embodiments of the present application, when the terminal has a data transmission requirement on the sidelink, the terminal initiates a system information request procedure to the network-side device to obtain sidelink transmission resources.

Here, the sidelink data includes but not limited to: D2D service data, V2X service data, and other subsequently-introduced sidelink service data.

In one embodiment, the terminal may use Msg1-based SI request or Msg3-based SI request when initiating the system information request procedure to the network-side device.

Correspondingly, the network-side device responds to the system information request procedure initiated by the terminal, where the system information request procedure is initiated by the terminal when a sidelink has a data transmission requirement and there is no available sidelink transmission resource.

The network-side device allocates sidelink transmission resources to the terminal through the system information request procedure.

In one embodiment, the terminal device receives the sidelink transmission resources allocated by the network-side device through the system information request procedure.

In some embodiments of the present application, the terminal, before sending the data according to the received sidelink transmission resources allocated by the network-side device through the system information request procedure, further determines whether there are available sidelink transmission resources in the information obtained through the system information request procedure.

Here, the information obtained by the terminal through the system information request procedure is system information related to direct communication, which is D2D related system information, or V2X related system information, or other related system information newly introduced by direct communication.

If there are available sidelink transmission resources in the system information related to sidelink communication obtained by the terminal through the system information request procedure, the data can be sent on any of the sidelink transmission resources in the obtained system information related to sidelink communication.

Or, if there is no available sidelink transmission resource in system information related to sidelink communication obtained by the terminal through the system information request procedure, the terminal obtains the sidelink transmission resources by initiating the RRC connection management related procedure.

Second Embodiment: the terminal device determines the procedure used for obtaining sidelink transmission resources according to its own implementation.

Here, the procedure used for obtaining sidelink transmission resources is the RRC connection management related procedure or system information request procedure.

In some embodiments of the present application, when the terminal determines whether to use the RRC connection management related procedure or the system information request procedure to obtain sidelink transmission resources according to its own implementation, the terminal determines the procedure used for obtaining sidelink transmission resources according to QoS parameters of a sidelink service and/or the signaling overhead used for acquiring the sidelink transmission resources, which will be specifically introduced in detail in the following ways.

Here, the QoS parameter of the service may be one or a combination of: the existing Priority Per Proximity-based Services Packet (i.e., Priority Per ProSe Packet, PPPP) or the existing Responsibility Per ProSe Packet (PPPR) or other QoS parameters of the sidelink that may be newly introduced later.

In a first way: the terminal determines the procedure used for obtaining sidelink transmission resources according to the QoS parameters of the sidelink service.

In one embodiment, the terminal determines that the procedure used for obtaining transmission resources to which the QoS parameters of the sidelink service correspond, according to the binding relationship between QoS parameters of the sidelink service and the procedure used for obtaining transmission resources.

In some embodiments of the present application, the terminal stores the binding relationship between QoS parameters of the sidelink service and the procedure used for obtaining transmission resources. For example, the terminal determines that the QoS parameter A is bound to the procedure used for obtaining transmission resources that is the RRC connection management related procedure, and determines that the QoS parameter B is bound to the procedure used for obtaining transmission resources that is the system information request procedure; and the terminal can determine the QoS parameter of the sidelink service by itself. When the terminal determines that the QoS parameter of the sidelink service is the QoS parameter A, the terminal determines that the procedure used for obtaining transmission resources bound to the QoS parameter A is the RRC connection management related procedure according to the above binding relationship, and then the terminal will initiate the RRC connection management related procedure.

In a second way: the terminal determines the procedure used for obtaining sidelink transmission resources according to the signaling overhead used for acquiring the sidelink transmission resources.

In one embodiment, if the terminal wants to save the signaling overhead, it can choose to use the system information request procedure. If the terminal does not need to save the signaling overhead, it can use the RRC connection management related procedure.

It should be noted that the implementation after it is determined that the procedure used by the terminal for obtaining transmission resources is the RRC connection management related procedure in the first way and/or second way described above is the same as the case 1 in the first embodiment, and the details will not be introduced.

Or, the implementation after it is determined that the procedure used by the terminal for obtaining transmission resources is the system information request procedure in the first way and/or second way described above is the same as the case 2 in the first embodiment, and the details will not be introduced.

Third Embodiment: the terminal determines procedure used for obtaining sidelink transmission resources according to the indication information of the network-side device;

Here, the procedure used for obtaining sidelink transmission resources is the RRC connection management related procedure or system information request procedure.

In some embodiments of this application, before the terminal determines whether to use the RRC connection management related procedure or the system information request procedure to obtain the sidelink transmission resources according to the indication information of the network-side device, the terminal will receive the indication information sent by the network-side device.

Specifically, the network-side device sends the indication information through a target message.

In one embodiment, the indication information notifies the terminal of the procedure used for obtaining sidelink transmission resources.

Here, the procedure used for obtaining sidelink transmission resources is the RRC connection related procedure or system information request procedure.

In one embodiment, the content of the indication information can be as follows.

Content 1: the system information related to sidelink communication of the current cell contains the indication information of a sidelink transmission resource pool, or the system information related to sidelink communication of the current cell does not contain the indication information of a sidelink transmission resource pool.

Or, content 2: the indication information of the procedure used by the terminal for obtaining sidelink transmission resources.

Or, content 3: a correspondence between QoS parameters and the procedure used for obtaining sidelink transmission resources, or a correspondence between a QoS parameter combination and the procedure used for obtaining sidelink transmission resources.

Or, content 4: thresholds of QoS parameters or a threshold of a QoS parameter combination corresponding to a procedure used for obtaining sidelink transmission resources.

Correspondingly, the terminal device receives the indication information sent by the network-side device through a target message, where the terminal is a terminal in the RRC IDLE state or a terminal in the RRC INACTIVE state.

In one embodiment, if the terminal is a terminal in the RRC IDLE state, the target message is at least one of: Master Information Block (MIB), System Information Block 1 (SIB1), RAN-level Paging. If the terminal is a terminal in the RRC INACTIVE state, the target message is at least one of: RRC Resume message, MIB, SIB1, RAN-level Paging.

In some embodiments of the present application, the terminal determines, after receiving the indication information sent by the network-side device according to the above target message, the procedure used for obtaining sidelink transmission resources according to the received indication information, it determines the procedure used for obtaining sidelink transmission resources mainly according to the content of the indication information, which will be specifically introduced in detail in the following ways.

In a first way: if the content of the indication information of the network-side device is that the system information related to sidelink communication of the current cell contains the indication information of a sidelink transmission resource pool, or if the content of the indication information of the network-side device is that the system information related to sidelink communication of the current cell does not contain the indication information of a sidelink transmission resource pool, the terminal determines the procedure used for obtaining sidelink transmission resources according to the indication information of the network-side device.

In some embodiments of the present application, when the terminal determines the procedure used for obtaining sidelink transmission resources according to the system information related to sidelink communication of the current cell sent by the network-side device, the terminal receives the system information related to the current sidelink communication sent by the network-side device, and determines whether the system information related to sidelink communication contains the indication information of the sidelink transmission resource pool. If the system information related to sidelink communication contains the indication information of the sidelink transmission resource pool, it is determined that the procedure used by the terminal for obtaining the sidelink transmission resource pool is a system information request procedure.

Or, if the system information related to sidelink communication does not contain the indication information of the sidelink transmission resource pool, it is determined that the procedure used by the terminal for obtaining the sidelink transmission resource pool is an RRC connection management related procedure.

In a second way: if the content of the indication information of the network-side device is the indication information of the procedure used by the terminal for obtaining sidelink transmission resources, the terminal determines the procedure used for obtaining sidelink transmission resources according to the indication information of the network-side device.

In some embodiments of the present application, the network-side device directly indicates the procedure used for obtaining sidelink transmission resources being an RRC connection management related procedure to the terminal, or directly indicates the procedure used for obtaining sidelink transmission resources being a system information request procedure to the terminal. When indicating, the network-side device uses the bit value to represent the indication information. For example, when the indication information is 1 bit, it means that the terminal will initiate the RRC connection management related procedure, and when the indication information is 0 bit, it means that the terminal will initiate the system information request procedure. Therefore, when the terminal receives 1 bit, it will initiate the RRC connection management related procedure.

In some embodiments of the present application, the content of the indication information sent by the network-side device to the terminal may also be M bits for indicating the procedure used by the terminal for obtaining sidelink transmission resources.

Taking PPPR as an example, if there are 8 PPPRs, the network-side device will use 3 bits (i.e., M=3) to instruct the terminal to initiate an RRC connection management related procedure when the service of each PPPR level of the sidelink of the terminal arrives.

Based on the above content, in order to save the signaling overhead, 8 PPPRs can also be grouped, for example, divided into 4 groups. Then 2 bits (i.e., M=2) will be used to instruct the terminal to initiate an RRC connection management related procedure when the service of each PPPR level of the sidelink of the terminal arrives.

In a third way: if the content of the indication information of the network-side device is a correspondence between QoS parameters and the procedure used for obtaining sidelink transmission resources, or a correspondence between a QoS parameter combination and the procedure used for obtaining sidelink transmission resources, the terminal determines, according to QoS parameters or a QoS parameter combination corresponding to a logical channel with data transmission requirement of the sidelink as well as the indication information of the network-side device, the procedure used for obtaining sidelink transmission resources.

In some embodiments of the present application, the content of the indication information sent by the network-side device to the terminal is the correspondence between QoS parameters and the procedure used for obtaining sidelink transmission resources or the correspondence between a QoS parameter combination and the procedure used for obtaining sidelink transmission resources. That is, the correspondence is sent. Since the terminal can determine the QoS parameters corresponding to the logical channel with data transmission requirement of the sidelink by itself, the terminal can determine, according to the correspondence sent by the network-side device, the procedure used for obtaining sidelink transmission resources, after the terminal determines the QoS parameters or parameter combination corresponding to the logical channel with data transmission requirement of the sidelink.

For example, the content of the indication information sent by the network-side device to the terminal is: the procedure used for obtaining sidelink transmission resources corresponding to the QoS parameter A is the RRC connection management related procedure; and the procedure used for obtaining sidelink transmission resources corresponding to the QoS parameter B is the system information request procedure. If the terminal determines that the QoS parameter corresponding to the logical channel with data transmission requirement of the sidelink is the QoS parameter A, the terminal will initiate the RRC connection management related procedure to obtain sidelink transmission resources.

In one embodiment, if the sidelink has a plurality of logical channels with data transmission requirements, the terminal selects a logical channel with the highest priority as the logical channel with data transmission requirement.

Specifically, the terminal determines that the sidelink has a plurality of logical channels with data transmission requirements: logical channel 1, logical channel 2, logical channel 3; and the logical channel 3 has a higher priority than the logical channel 1 and logical channel 2. At this time, the terminal determines the logical channel 3 as the logical channel with data transmission requirement. If the QoS parameter of the logical channel 3 is the QoS parameter B, the terminal will initiate a system information request procedure to obtain sidelink transmission resources.

In a fourth way: if the content of the indication information of the network-side device is thresholds of QoS parameters or the threshold of a QoS parameter combination corresponding to the procedure used for obtaining sidelink transmission resources, the terminal determines the procedure used for obtaining sidelink transmission resources, according to the QoS parameters or parameter combination corresponding to a logical channel with data transmission requirement of the sidelink as well as the indication information of the network-side device.

In some embodiments of the present application, the terminal can determine the size relationship between the QoS parameters or parameter combination corresponding to the logical channel with data transmission requirement of the sidelink, and the thresholds of the QoS parameters or the threshold of the QoS parameter combination corresponding to the procedure used for obtaining sidelink transmission resources sent by the network-side device; obtain the protocol agreement of the procedures used for obtaining sidelink transmission resources; and the terminal itself can determine the QoS parameters or parameter combination corresponding to the logical channel with data transmission requirement of the sidelink.

Assuming that the protocol stipulates: the QoS parameter corresponding to the logical channel with data transmission requirement of the sidelink is greater than the threshold of the QoS parameter corresponding to the procedure used for obtaining sidelink transmission resources sent by the network-side device, the terminal determines that the procedure used for obtaining sidelink transmission resources is the RRC connection management related procedure, otherwise the system information request procedure is used.

Specifically, based on the foregoing protocol agreement, it is assumed that the threshold of the QoS parameter corresponding to the procedure used for obtaining sidelink transmission resources sent by the network-side device is 5, and the QoS parameter corresponding to the logical channel with data transmission requirement of the sidelink determined by the terminal is 6. At this time, the terminal determines that the QoS parameter corresponding to the logical channel with data transmission requirement of the sidelink is greater than the threshold of the QoS parameter corresponding to the procedure used for obtaining sidelink transmission resources sent by the network-side device, and then the terminal determines that the procedure used for obtaining sidelink transmission resources is the RRC connection management related procedure.

In some embodiments of the present application, the content of the indication information of the network-side device may also be the threshold of the QoS parameter or the threshold of the QoS parameter combination corresponding to the procedure used for obtaining transmission resources of multiple sidelinks. In this case, the terminal can still determine the procedure used for obtaining sidelink transmission resources, according to the protocol agreement, the received indication information of the network-side device and the QoS parameters corresponding to the logical channel with data transmission requirement of the sidelink determined by itself.

It should be noted that the implementation after it is determined that the procedure used by the terminal for obtaining transmission resources is the RRC connection management related procedure in at least one of the first, second, third and fourth ways described above is the same as the case 1 in the first embodiment, and the details will not be introduced.

Or, the implementations after it is determined that the procedure used by the terminal for obtaining transmission resources is the system information request procedure in at least one of the first, second, third and fourth ways described above is the same as the case 2 in the first embodiment, and the details will not be introduced.

Figure 2:
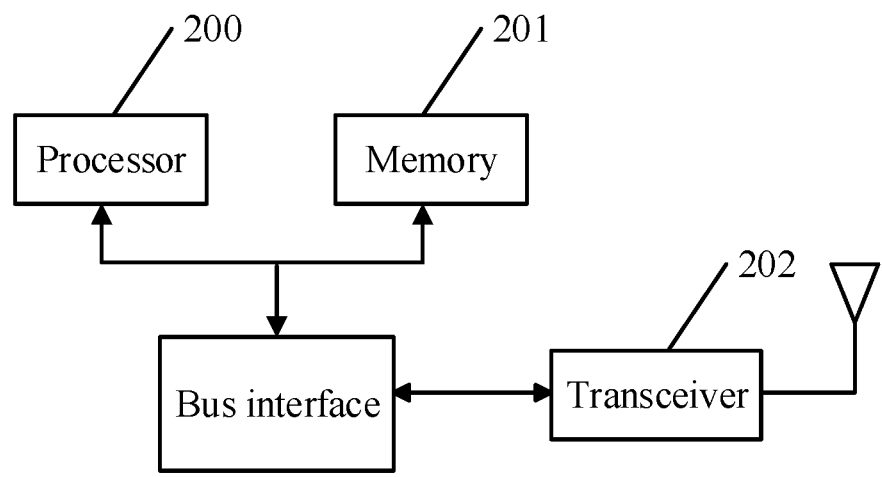
FIG. 2 is a structural schematic diagram of a first resource allocation device provided by an embodiment of the present application.

As shown in FIG. 2, a first resource allocation device of some embodiments of the present application includes a processor 200, a memory 201 and a transceiver 202.

The processor 200 is for managing the bus architecture and general processing, and the memory 201 may store the data used by the processor 200 when performing the operations. The transceiver 202 is configured to receive and send the data under the control of the processor 200.

The bus architecture may include any numbers of interconnected buses and bridges, and specifically link various circuits of one or more processors represented by the processor 200 and the memory represented by the memory 201. The bus architecture may further link various other circuits such as peripheral device, voltage regulator and power management circuit, which are all well known in the art and thus will not be further described again herein. The bus interface provides an interface. The processor 200 is for managing the bus architecture and general processing, and the memory 201 may store the data used by the processor 200 when performing the operations.

The procedure disclosed by the embodiment of the present application may be applied in the processor 200 or implemented by the processor 200. In the implementation process, each step of the signal processing flow may be completed by the integrated logic circuit of hardware in the processor 200 or the instruction in the form of software. The processor 200 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 201, and the processor 200 reads the information in the memory 201 and completes the steps of the signal processing flow in combination with its hardwares.

Specifically, the processor 200 is configured to read the program in the memory 201 and perform:
  determining whether there is a sidelink transmission resource when a sidelink has a data transmission requirement; and obtaining a sidelink transmission resource by initiating an RRC connection management related procedure or a system information request procedure, when there is no sidelink transmission resource.

In one embodiment, the device is a terminal in the RRC IDLE state or a terminal in the RRC INACTIVE state.

In one embodiment, the processor 200 is further configured to:
  read a currently-broadcast system information, and when there is system information that is being broadcast and carries a sidelink transmission resource, determine that there is a sidelink transmission resource; otherwise, determine that there is no sidelink transmission resource; or
  determine whether the previously-stored system information carrying a sidelink transmission resource is available, according to a system information area identifier and a system information validity identifier carried in a system information block 1 of a current cell; if so, determine that there is a sidelink transmission resource; otherwise, determine that there is no sidelink transmission resource; or
  determine whether the previously-stored system information carrying a sidelink transmission resource is available, according to a system information area identifier and a system information validity identifier carried in a system information block 1 of a current cell; if so, determine that there is a sidelink transmission resource; otherwise, read a currently-broadcast system information, and when there is system information that is being broadcast and carries a sidelink transmission resource, determine that there is a sidelink transmission resource; otherwise, determine that there is no sidelink transmission resource; or
  read a currently-broadcast system information, and when there is system information that is being broadcast and carries a sidelink transmission resource, determine that there is a sidelink transmission resource; otherwise, determine whether the previously-stored system information carrying a sidelink transmission resource is available according to a system information area identifier and a system information validity identifier carried in a system information block 1 of a current cell; if so, determine that there is a sidelink transmission resource; otherwise, determine that there is no sidelink transmission resource.

In one embodiment, the processor 200 is further configured to:
determine the procedure for obtaining a sidelink transmission resource according to protocol agreement; or
determine the procedure for obtaining a sidelink transmission resource according to its own implementation; or
determine the procedure for obtaining a sidelink transmission resource according to the indication information of a network-side device;
where the procedure for obtaining a sidelink transmission resource is the RRC connection management related procedure or system information request procedure.

In one embodiment, the protocol stipulates that the processor 200 uses only the RRC connection management related procedure; or
the protocol stipulates that the processor 200 uses only the system information request procedure.

In one embodiment, the processor 200 is specifically configured to:
determine the procedure for obtaining a sidelink transmission resource according to QoS parameters of a sidelink service and/or signaling overheads used for acquiring a sidelink transmission resource.

In one embodiment, the processor 200 is specifically configured to:
when the indication information of the network-side device indicates that system information related to sidelink communication of a current cell contains indication information of a sidelink transmission resource pool, or indicates that system information related to sidelink communication of a current cell does not contain indication information of a sidelink transmission resource pool, determine the procedure for obtaining a sidelink transmission resource according to the indication information of the network-side device; or
when the indication information of the network-side device indicates a procedure to be initiated by the terminal for obtaining a sidelink transmission resource, determine the procedure for obtaining a sidelink transmission resources according to the indication information of the network-side device; or
when the indication information of the network-side device includes a correspondence between QoS parameters and a procedure for obtaining a sidelink transmission resource, or includes a correspondence between a QoS parameter combination and the procedure for obtaining a sidelink transmission resource, determine the procedure for obtaining a sidelink transmission resource according to QoS parameters or a QoS parameter combination corresponding to a logical channel with data transmission requirement of the sidelink, as well as the indication information of the network-side device; or
when the indication information of the network-side device includes thresholds of QoS parameters or a threshold of a QoS parameter combination corresponding to a procedure for obtaining a sidelink transmission resource, determine the procedure for obtaining a sidelink transmission resource, according to QoS parameters or a QoS parameter combination corresponding to a logical channel with data transmission requirement of the sidelink, as well as the indication information of the network-side device.

In one embodiment, when the sidelink has a plurality of logical channels with data transmission requirements, a logical channel with the highest priority is determined as the logical channel with data transmission requirement.

In one embodiment, the processor 200 is further configured to:
when the indication information of the network-side device indicates that the system information related to sidelink communication of the current cell contains the indication information of the sidelink transmission resource pool, determine the procedure for obtaining a sidelink transmission resource pool as a system information request procedure; or
when the indication information of the network-side device indicates that the system information related to sidelink communication of the current cell does not contain the indication information of the sidelink transmission resource pool, determine the procedure for obtaining a sidelink transmission resource pool as an RRC connection management related procedure.

In one embodiment, the processor 200 is further configured to:
receive the indication information of the network-side device through a target message;
where when the device is a terminal in the RRC INACTIVE state, the target message is at least one of RRC Resume message, MIB, SIB1, RAN-level Paging;
when the device is a terminal in the RRC IDLE state, the target message is at least one of MIB, SIB1, RAN-level Paging.

In one embodiment, the processor 200 is further configured to:
when there is no available sidelink transmission resource in the system information related to sidelink communication obtained through the system information request procedure, obtain the sidelink transmission resource by initiating the RRC connection management related procedure.

In one embodiment, when the device is a terminal in the RRC INACTIVE state, the initiated RRC connection management related procedure is an RRC connection resume procedure; or
when the device is a terminal in the RRC IDLE state, the initiated RRC connection management related procedure is an RRC connection establishment procedure.

Figure 3:
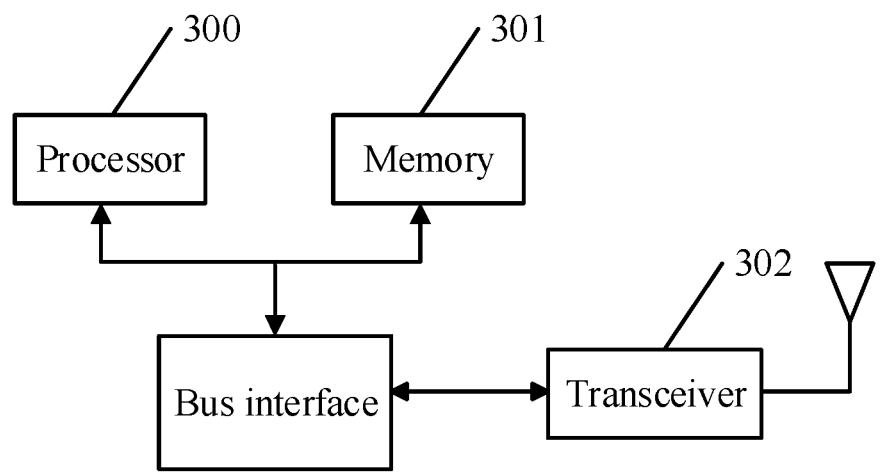
FIG. 3 is a structural schematic diagram of a second resource allocation device provided by an embodiment of the present application.

As shown in FIG. 3, a second resource allocation device of some embodiments of the present application includes a processor 300, a memory 301 and a transceiver 302.

The processor 300 is for managing the bus architecture and general processing, and the memory 301 may store the data used by the processor 300 when performing the operations. The transceiver 302 is configured to receive and send the data under the control of the processor 300.

The bus architecture may include any numbers of interconnected buses and bridges, and specifically link various circuits of one or more processors represented by the processor 300 and the memory represented by the memory 301. The bus architecture may further link various other circuits such as peripheral device, voltage regulator and power management circuit, which are all well known in the art and thus will not be further described again herein. The bus interface provides an interface. The processor 300 is for managing the bus architecture and general processing, and the memory 301 may store the data used by the processor 300 when performing the operations.

The procedure disclosed by the embodiment of the present application may be applied in the processor 300 or implemented by the processor 300. In the implementation process, each step of the signal processing flow may be completed by the integrated logic circuit of hardware in the processor 300 or the instruction in the form of software. The processor 300 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 301, and the processor 300 reads the information in the memory 301 and completes the steps of the signal processing flow in combination with its hardwares.

Specifically, the processor 300 is configured to read the program in the memory 301 and perform:
responding to an RRC connection management related procedure or a system information request procedure initiated by a terminal, and the RRC connection management related procedure or system information request procedure is initiated by the terminal when a sidelink has a data transmission requirement and there is no available sidelink transmission resource; and
allocating a sidelink transmission resource to the terminal through the RRC connection management related procedure or system information request procedure.

In one embodiment, the processor 300 is further configured to:
notify the terminal of the procedure for obtaining a sidelink transmission resource through indication information;
and the procedure for obtaining a sidelink transmission resource is the RRC connection management related procedure or system information request procedure.

In one embodiment, the indication information indicates that system information related to sidelink communication of a current cell contains indication information of a sidelink transmission resource pool, or indicates that system information related to sidelink communication of a current cell does not contain indication information of a sidelink transmission resource pool; or
the indication information indicates a procedure to be initiated by the terminal for obtaining a sidelink transmission resource; or
the indication information includes a correspondence between QoS parameters and the procedure for obtaining a sidelink transmission resource, or includes a correspondence between a QoS parameter combination and a procedure for obtaining a sidelink transmission resource; or
the indication information includes thresholds of QoS parameters or a threshold of a QoS parameter combination corresponding to a procedure for obtaining a sidelink transmission resource.

In one embodiment, the processor 300 is further configured to:
send the indication information through a target message;
where when the terminal in the RRC INACTIVE state, the target message is at least one of: RRC Resume message, MIB, SIB1, RAN-level Paging;
when the terminal in the RRC IDLE state, the target message is at least one of: MIB, SIB1, RAN-level Paging.

In one embodiment, when the terminal is in the RRC INACTIVE state, the RRC connection management related procedure performed by the processor 300 and terminal is an RRC connection resume procedure; or
when the terminal is in the RRC IDLE state, the RRC connection management related procedure performed by the processor 300 and terminal is an RRC connection establishment procedure.

Figure 4:
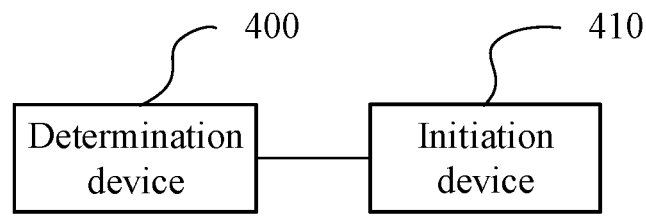
FIG. 4 is a structural schematic diagram of a third resource allocation device provided by an embodiment of the present application.

As shown in FIG. 4, which is a structural schematic diagram of a third resource allocation device provided by some embodiments of the present application, the device includes: a judgment device 400 and an initiation device 410;
the determination device 400 is configured to determine whether there is a sidelink transmission resource when a sidelink has a data transmission requirement;
the initiation device 410 is configured to obtain a sidelink transmission resource by initiating an RRC connection management related procedure or a system information request procedure, when there is no sidelink transmission resource.

In one embodiment, the terminal is in the RRC IDLE state or in the RRC INACTIVE state.

In one embodiment, the determination device 400 is further configured to:
read a currently-broadcast system information, and when there is system information that is being broadcast and carries a sidelink transmission resource, determine that there is a sidelink transmission resource; otherwise, determine that there is no sidelink transmission resource; or
determine whether the previously-stored system information carrying a sidelink transmission resource is available, according to a system information area identifier and a system information validity identifier carried in a system information block 1 of a current cell; if so, determine that there is a sidelink transmission resource; otherwise, determine that there is no sidelink transmission resource; or
determine whether the previously-stored system information carrying a sidelink transmission resource is available, according to a system information area identifier and a system information validity identifier carried in a system information block 1 of a current cell; if so, determine that there is a sidelink transmission resource; otherwise, read a currently-broadcast system information, and when there is system information that is being broadcast and carries a sidelink transmission resource, determine that there is a sidelink transmission resource; otherwise, determine that there is no sidelink transmission resource; or
read a currently-broadcast system information, and when there is system information that is being broadcast and carries a sidelink transmission resource, determine that there is a sidelink transmission resource; otherwise, determine whether the previously-stored system information carrying a sidelink transmission resource is available according to a system information area identifier and a system information validity identifier carried in a system information block 1 of a current cell; if so, determine that there is a sidelink transmission resource; otherwise, determine that there is no sidelink transmission resource.

In one embodiment, the initiation device 410 is further configured to:
determine the procedure for obtaining a sidelink transmission resource according to protocol agreement; or
determine the procedure for obtaining a sidelink transmission resource according to its own implementation; or
determine the procedure for obtaining a sidelink transmission resource according to the indication information of a network-side device;
where the procedure for obtaining a sidelink transmission resource is the RRC connection management related procedure or system information request procedure.

In one embodiment, the protocol stipulates that the terminal uses only the RRC connection management related procedure; or
the protocol stipulates that the terminal uses only the system information request procedure.

In one embodiment, the initiation device 410 is further configured to:
determine the procedure for obtaining a sidelink transmission resource according to QoS parameters of a sidelink service and/or signaling overheads used for acquiring a sidelink transmission resource.

In one embodiment, the initiation device 410 is further configured to:
when the indication information of the network-side device indicates that system information related to sidelink communication of a current cell contains indication information of a sidelink transmission resource pool, or indicates that system information related to sidelink communication of a current cell does not contain indication information of a sidelink transmission resource pool, determine the procedure for obtaining a sidelink transmission resource according to the indication information of the network-side device; or
when the indication information of the network-side device indicates the procedure to be initiated by the terminal for obtaining a sidelink transmission resource, determine the procedure for obtaining a sidelink transmission resource according to the indication information of the network-side device; or
when the indication information of the network-side device includes a correspondence between QoS parameters and a procedure for obtaining a sidelink transmission resource, or includes a correspondence between a QoS parameter combination and the procedure for obtaining a sidelink transmission resources, determine the procedure used for obtaining sidelink transmission resource, according to QoS parameters or a QoS parameter combination corresponding to a logical channel with data transmission requirement of the sidelink, as well as the indication information of the network-side device; or
when the indication information of the network-side device includes thresholds of QoS parameters or a threshold of a QoS parameter combination corresponding to a procedure for obtaining a sidelink transmission resource, determine the procedure for obtaining a sidelink transmission resource, according to QoS parameters or a QoS parameter combination corresponding to a logical channel with data transmission requirement of the sidelink, as well as the indication information of the network-side device.

In one embodiment, the device is further configured to:
when the sidelink has a plurality of logical channels with data transmission requirements, determine a logical channel with the highest priority as the logical channel with data transmission requirement.

In one embodiment, the initiation device 410 is further configured to:
when the indication information of the network-side device indicates that system information related to sidelink communication of the current cell contains the indication information of the sidelink transmission resource pool, determine the procedure for obtaining a sidelink transmission resource pool as a system information request procedure; or
when the indication information of the network-side device indicates that the system information related to sidelink communication of the current cell does not contain the indication information of the sidelink transmission resource pool, determine the procedure for obtaining a sidelink transmission resource pool as an RRC connection management related procedure.

In one embodiment, the initiation device 410 is further configured to:
receive the indication information of the network-side device through a target message;
where when the terminal is a terminal in the RRC INACTIVE state, the target message is at least one of RRC Resume message, MIB, SIB1, RAN-level Paging;
when the terminal is a terminal in the RRC IDLE state, the target message is at least one of: MIB, SIB1, RAN-level Paging.

In one embodiment, the initiation device 410 is further configured to:
when there is no available sidelink transmission resource in the system information related to sidelink communication obtained by the terminal through the system information request procedure, obtain the sidelink transmission resource by initiating the RRC connection management related procedure.

In one embodiment, when the terminal is in the RRC INACTIVE state, the RRC connection management related procedure initiated by the terminal is an RRC connection resume procedure; or
when the terminal is in the RRC IDLE state, the RRC connection management related procedure initiated by the terminal is an RRC connection establishment procedure.

Figure 5:
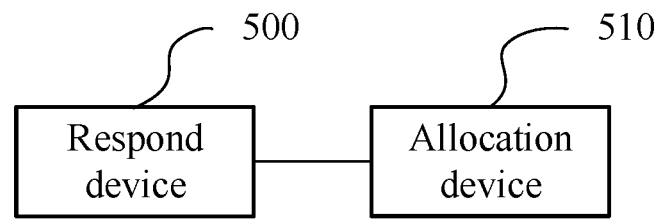
FIG. 5 is a structural schematic diagram of a fourth resource allocation device provided by an embodiment of the present application.

As shown in FIG. 5, which is a structural schematic diagram of a fourth resource allocation device provided by some embodiments of the present application, the device includes: a respond device 500 and an allocation device 510;
the response device 500 is configured to respond to an RRC connection management related procedure or a system information request procedure initiated by a terminal, where the RRC connection management related procedure or system information request procedure is initiated by the terminal, when a sidelink has a data transmission requirement and there is no available sidelink transmission resource;
the allocation device 510 is configured to allocate a sidelink transmission resource to the terminal through the RRC connection management related procedure or system information request procedure.

In one embodiment, the response device 500 is further configured to:

notify the terminal of a procedure for obtaining a sidelink transmission resource through indication information;

where the procedure for obtaining a sidelink transmission resource is the RRC connection management related procedure or system information request procedure.

In one embodiment, the indication information indicates that system information related to sidelink communication of a current cell contains indication information of a sidelink transmission resource pool, or indicates that system information related to sidelink communication of a current cell does not contain indication information of a sidelink transmission resource pool; or the indication information indicates a procedure to be initiated by the terminal for obtaining a sidelink transmission resource; or the indication information includes a correspondence between QoS parameters and the procedure for obtaining a sidelink transmission resource, or includes a correspondence between a QoS parameter combination and a procedure for obtaining a sidelink transmission resource; or the indication information includes thresholds of QoS parameters or a threshold of a QoS parameter combination corresponding to a procedure for obtaining a sidelink transmission resource.

In one embodiment, the response device 500 is further configured to:

send the indication information through a target message;

where when the terminal is in the RRC INACTIVE state, the target message is at least one of: RRC Resume message, MIB, SIB1, RAN-level Paging;

when the terminal is in the RRC IDLE state, the target message is at least one of MIB, SIB1, RAN-level Paging.

In one embodiment, when the terminal is in the RRC INACTIVE state, the RRC connection management related procedure performed by the network-side device and terminal is an RRC connection resume procedure; or when the terminal is in the RRC IDLE state, the RRC connection management related procedure performed by the network-side device and terminal is an RRC connection establishment procedure.

Based on the same inventive concept, some embodiments of the present application further provide a resource allocation method. Since the device corresponding to this method is the resource allocation device of the embodiments of the present application and the principle solving the problem of this device is similar to that of this method, the implementations of this method can refer to the implementations of the device, and the repeated description thereof will be omitted here.

Figure 6:
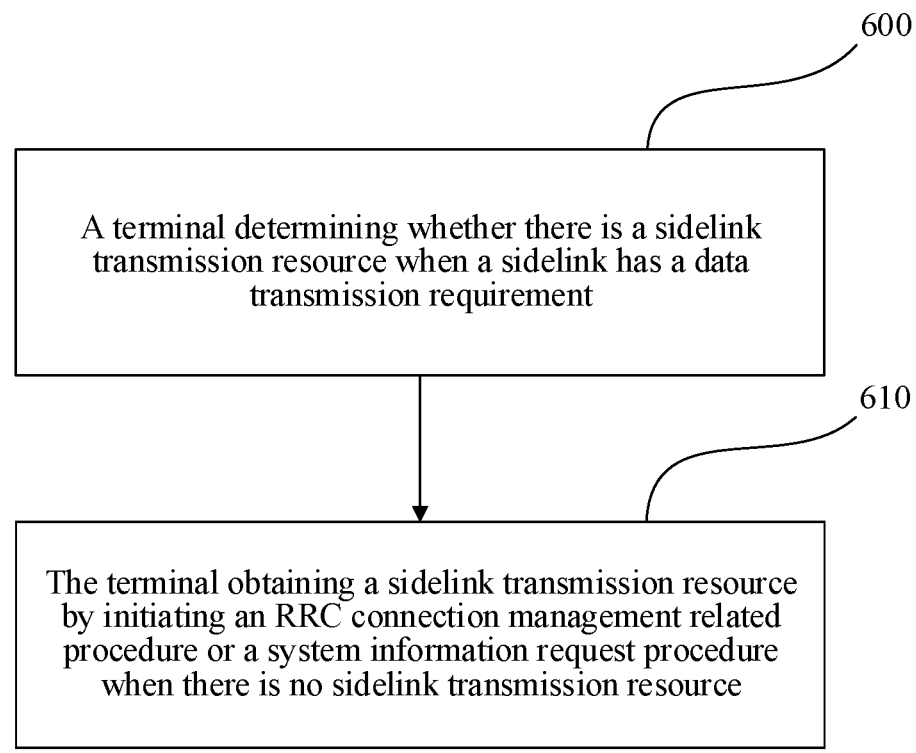
FIG. 6 is a flowchart of a first resource allocation method provided by an embodiment of the present application.

As shown in FIG. 6, which is a flow chart of a resource allocation method provided by some embodiments of the present application, the method specifically includes the following steps:

Step 600: a terminal determining whether there is a sidelink transmission resource when a sidelink has a data transmission requirement;

Step 610: the terminal obtaining a sidelink transmission resource by initiating an RRC connection management related procedure or a system information request procedure, when there is no sidelink transmission resource.

In one embodiment, the terminal is in the RRC IDLE state or in the RRC INACTIVE state.

In one embodiment, when the terminal determines whether there is a sidelink transmission resource, the terminal reads a currently-broadcast system information, and if there is system information that is being broadcast and carries sidelink transmission resources, determines that there is a sidelink transmission resource; otherwise, determines that there is no sidelink transmission resource; or the terminal determines whether the previously-stored system information carrying a sidelink transmission resource is available, according to a system information area identifier and a system information validity identifier carried in a system information block 1 of a current cell; if so, determines that there is a sidelink transmission resource; otherwise, determines that there is no sidelink transmission resource; or the terminal determines whether the previously-stored system information carrying a sidelink transmission resource is available, according to a system information area identifier and a system information validity identifier carried in a system information block 1 of a current cell; if so, determines that there is a sidelink transmission resource; otherwise, the terminal reads a currently-broadcast system information, and when there is system information that is being broadcast and carries a sidelink transmission resource, determines that there is a sidelink transmission resource; otherwise, determines that there is no sidelink transmission resource; or the terminal reads a currently-broadcast system information, and when there is system information that is being broadcast and carries a sidelink transmission resource, determines that there is a sidelink transmission resource; otherwise, the terminal determines whether previously-stored system information carrying a sidelink transmission resource is available, according to a system information area identifier and a system information validity identifier carried in a system information block 1 of a current cell; if so, determines that there is a sidelink transmission resource; otherwise, determines that there is no sidelink transmission resource.

In one embodiment, before the terminal initiates the RRC connection management related procedure or system information request procedure to obtain a sidelink transmission resource, the terminal determines a procedure for obtaining a sidelink transmission resource according to protocol agreement; or the terminal determines a procedure for obtaining a sidelink transmission resource according to its own implementation; or the terminal determines a procedure for obtaining a sidelink transmission resource according to indication information of a network-side device;

where the procedure for obtaining a sidelink transmission resource is the RRC connection management related procedure or system information request procedure.

In one embodiment, the protocol stipulates that the terminal uses only the RRC connection management related procedure; or the protocol stipulates that the terminal uses only the system information request procedure.

In one embodiment, when the terminal determines the procedure for obtaining a sidelink transmission resource according to its own implementation, the terminal determines the procedure for obtaining a sidelink transmission resource according to QoS parameters of a sidelink service and/or signaling overheads used for acquiring a sidelink transmission resource.

In one embodiment, when the terminal determines the procedure for obtaining a sidelink transmission resource according to the indication information of the network-side device, and when the indication information of the network-side device indicates that system information related to sidelink communication of a current cell contains indication information of a sidelink transmission resource pool, or indicates that system information related to sidelink communication of a current cell does not contain indication information of a sidelink transmission resource pool, the terminal determines the procedure for obtaining s sidelink transmission resource according to the indication information of the network-side device; or when the indication information of the network-side device indicates a procedure to be initiated by the terminal for obtaining a sidelink transmission resource, the terminal determines the procedure for obtaining a sidelink transmission resource according to the indication information of the network-side device; or when the indication information of the network-side device includes a correspondence between QoS parameters and a procedure for obtaining a sidelink transmission resource, or includes a correspondence between a QoS parameter combination and a procedure for obtaining a sidelink transmission resource, the terminal determines the procedure for obtaining a sidelink transmission resource according to QoS parameters or a QoS parameter combination corresponding to a logical channel with data transmission requirement of the sidelink, as well as the indication information of the network-side device; or when the indication information of the network-side device includes thresholds of QoS parameters or a threshold of a QoS parameter combination corresponding to a procedure for obtaining a sidelink transmission resource, the terminal determines the procedure for obtaining a sidelink transmission resource, according to QoS parameters or a QoS parameter combination corresponding to a logical channel with data transmission requirement of the sidelink, as well as the indication information of the network-side device.

In one embodiment, when the sidelink has a plurality of logical channels with data transmission requirements, the terminal determines a logical channel with the highest priority as the logical channel with data transmission requirement.

In one embodiment, when the indication information of the network-side device indicates that system information related to sidelink communication of a current cell contains indication information of a sidelink transmission resource pool, or indicates that system information related to sidelink communication of a current cell does not contain indication information of a sidelink transmission resource pool, the terminal determines the procedure for obtaining a sidelink transmission resource according to the indication information of the network-side device, and when the indication information of the network-side device indicates that the system information related to sidelink communication of the current cell contains the indication information of the sidelink transmission resource pool, the terminal determines the procedure for obtaining a sidelink transmission resource pool as a system information request procedure; or when the indication information of the network-side device indicates that the system information related to sidelink communication of the current cell does not contain the indication information of the sidelink transmission resource pool, the terminal determines the procedure for obtaining a sidelink transmission resource pool as an RRC connection management related procedure.

In one embodiment, before the terminal determines the procedure for obtaining a sidelink transmission resource according to the indication information of the network-side device, the terminal receives the indication information of the network-side device through a target message;

where when the terminal is in the RRC INACTIVE state, the target message is at least one of: RRC Resume message, MIB, SIB1, RAN-level Paging;

when the terminal is in the RRC IDLE state, the target message is at least one of MIB, SIB1, RAN-level Paging.

In one embodiment, after the terminal initiates the system information request procedure, when there is no available sidelink transmission resource in system information related to sidelink communication obtained by the terminal through the system information request procedure, the terminal obtains the sidelink transmission resource by initiating the RRC connection management related procedure.

In one embodiment, when the terminal is in the RRC INACTIVE state, the RRC connection management related procedure initiated by the terminal is an RRC connection resume procedure; or when the terminal is in the RRC IDLE state, the RRC connection management related procedure initiated by the terminal is an RRC connection establishment procedure.

Based on the same inventive concept, some embodiments of the present application further provide another resource allocation method. Since the device corresponding to this method is the resource allocation device of the embodiments of the present application and the principle solving the problem of this device is similar to that of this method, the implementations of this method can refer to the implementations of the device, and the repeated description thereof will be omitted here.

Figure 7:
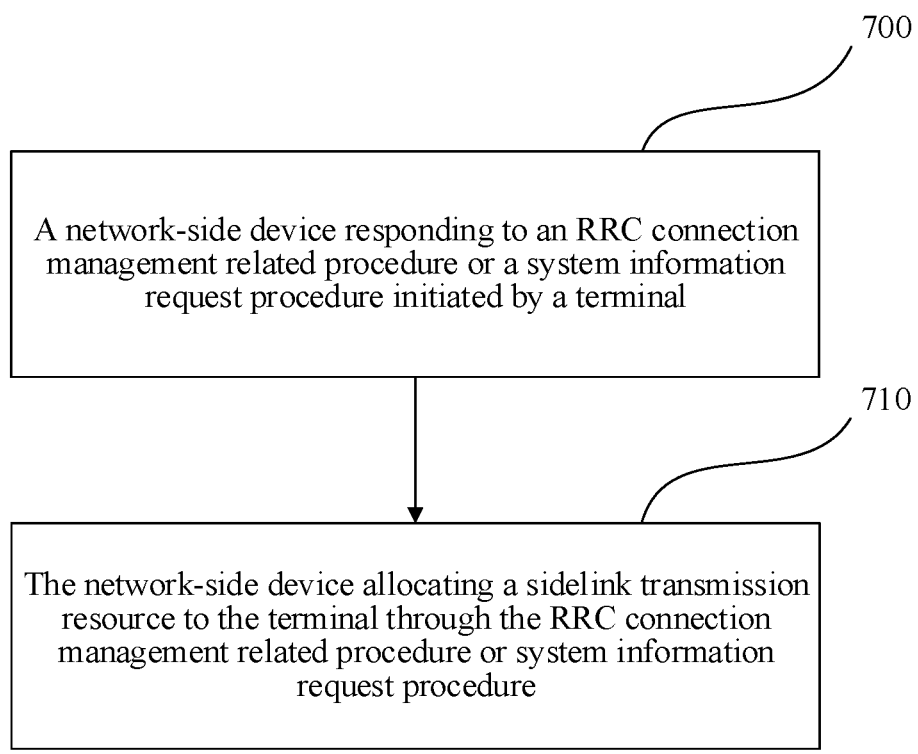
FIG. 7 is a flowchart of a second resource allocation method provided by an embodiment of the present application.

As shown in FIG. 7, which is a flow chart of a resource allocation method provided by some embodiments of the present application, the method specifically includes the following steps:

Step 700: a network-side device responding to an RRC connection management related procedure or a system information request procedure initiated by a terminal, where the RRC connection management related procedure or system information request procedure is initiated by the terminal, when a sidelink has a data transmission requirement and there is no available sidelink transmission resource;

Step 710: the network-side device allocating a sidelink transmission resource to the terminal through the RRC connection management related procedure or system information request procedure.

In one embodiment, before the network-side device responds to the RRC connection management related procedure or system information request procedure initiated by the terminal, the network-side device notifies the terminal of a procedure for obtaining a sidelink transmission resource through indication information;

where the procedure for obtaining a sidelink transmission resource is the RRC connection management related procedure or system information request procedure.

In one embodiment, the indication information indicates that system information related to sidelink communication of a current cell contains indication information of a sidelink transmission resource pool, or indicates that system information related to sidelink communication of a current cell does not contain indication information of a sidelink transmission resource pool; or the indication information indicates a procedure to be initiated by the terminal for obtaining a sidelink transmission resource; or the indication information includes a correspondence between QoS parameters and the procedure for obtaining a sidelink transmission resource, or includes a correspondence between a QoS parameter combination and the procedure for obtaining a sidelink transmission resource; or the indication information includes thresholds of QoS parameters or a threshold of a QoS parameter combination corresponding to a procedure for obtaining a sidelink transmission resource.

In one embodiment, when the network-side device notifies the terminal of the procedure for obtaining a sidelink transmission resource through the indication information, the network-side device sends the indication information through a target message;

where when the terminal is in the RRC INACTIVE state, the target message is at least one of: RRC Resume message, MIB, SIB1, RAN-level Paging;

when the terminal is in the RRC IDLE state, the target message is at least one of MIB, SIB1, RAN-level Paging.

In one embodiment, when the terminal is in the RRC INACTIVE state, the RRC connection management related procedure performed by the network-side device and terminal is an RRC connection resume procedure; or when the terminal is in the RRC IDLE state, the RRC connection management related procedure performed by the network-side device and terminal is an RRC connection establishment procedure.

An embodiment of the present application further provides a computer storable medium storing a computer program thereon, where the program, when executed by a processor, implements the above steps of the method described in FIG. 6 or implements the above steps of the method described in FIG. 7.

The present application has been described above by reference to the block diagrams and/or flow charts showing the methods, devices (systems) and/or computer program products according to the embodiments of the present application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can contain, store, communicate with, transmit or transfer the programs, to be used by the instruction execution system, apparatus or device, or used in combination with the instruction execution system, apparatus or device.

What is claimed is:

1. A resource allocation method, the method comprising:

determining, by a terminal, whether there is a sidelink transmission resource, when a sidelink has a data transmission requirement;

obtaining, by the terminal, a sidelink transmission resource by initiating a Radio Resource Control (RRC) connection management related procedure or system information request procedure, when there is no sidelink transmission resource;

wherein the determining, by the terminal, whether there is a sidelink transmission resource, comprises:

determining, by the terminal, whether previously-stored system information carrying a sidelink transmission resource is available, according to a system information area identifier and a system information validity identifier carried in a system information block 1 of a current cell, and:

when the previously-stored system information carrying the sidelink transmission resource is available, determining that there is a sidelink transmission resource; or when the previously-stored system information carrying the sidelink transmission resource is unavailable, determining that there is no sidelink transmission resource;

or determining, by the terminal, whether previously-stored system information carrying a sidelink transmission resource is available, according to a system information area identifier and a system information validity identifier carried in a system information block 1 of a current cell, and:

when the previously-stored system information carrying the sidelink transmission resource is available, determining that there is a sidelink transmission resource; or when the previously-stored system information carrying the sidelink transmission resource is unavailable, reading, by the terminal, a currently-broadcast system information, and:

when there is system information that is being broadcast and carries a sidelink transmission resource, determining that there is a sidelink transmission resource; or when there is no system information that is being broadcast and carries a sidelink transmission resource, determining that there is no sidelink transmission resource;

or reading, by the terminal, a currently-broadcast system information, and:

when there is no system information that is being broadcast and carries a sidelink transmission resource, determining, by the terminal, whether previously-stored system information carrying a sidelink transmission resource is available, according to a system information area identifier and a system information validity identifier carried in a system information block 1 of a current cell; and:

when the previously-stored system information carrying a sidelink transmission resource is available, determining that there is a sidelink transmission resource; or when the previously-stored system information carrying a sidelink transmission resource is unavailable, determining that there is no sidelink transmission resource.

2. The method of claim 1, wherein the terminal is in a Radio Resource Control Idle (RRC IDLE) state, or in a Radio Resource Control Inactive (RRC INACTIVE) state; and
    when the terminal is in the RRC INACTIVE state, the RRC connection management related procedure initiated by the terminal is an RRC connection resume procedure; or
    when the terminal is in the RRC IDLE state, the RRC connection management related procedure initiated by the terminal is an RRC connection establishment procedure.

3. The method of claim 1, before the terminal initiates the RRC connection management related procedure or system information request procedure to obtain a sidelink transmission resource, further comprising:
    determining, by the terminal, a procedure for obtaining a sidelink transmission resource according to protocol; or
    determining, by the terminal, a procedure for obtaining a sidelink transmission resource according to its own implementation; or
    determining, by the terminal, a procedure for obtaining a sidelink transmission resource according to indication information of a network-side device;
    wherein the procedure for obtaining a sidelink transmission resource is the RRC connection management related procedure or system information request procedure.

4. The method of claim 3, wherein the protocol stipulates that:
    the terminal uses the RRC connection management related procedure; or
    the terminal uses the system information request procedure; and
    wherein the determining, by the terminal, the procedure for obtaining a sidelink transmission resource according to its own implementation, comprises:
    determining, by the terminal, the procedure for obtaining a sidelink transmission resource according to Quality of Service (QoS) parameters of a sidelink service; or
    determining, by the terminal, the procedure for obtaining a sidelink transmission resource according to signaling overheads used for acquiring a sidelink transmission resource; or
    determining, by the terminal, the procedure for obtaining a sidelink transmission resource according to QoS parameters of a sidelink service, and signaling overheads used for acquiring a sidelink transmission resource.

5. The method of claim 3, wherein the determining, by the terminal, the procedure for obtaining a sidelink transmission resource according to the indication information of the network-side device, comprises:
    when the indication information of the network-side device indicates that system information related to sidelink communication of a current cell contains indication information of a sidelink transmission resource pool, determining, by the terminal, the procedure for obtaining a sidelink transmission resource pool as a system information request procedure; or
    when the indication information of the network-side device indicates that system information related to sidelink communication of a current cell does not contain indication information of a sidelink transmission resource pool, determining, by the terminal, the procedure for obtaining a sidelink transmission resource pool as an RRC connection management related procedure; or
    when the indication information of the network-side device indicates a procedure to be initiated by the terminal for obtaining a sidelink transmission resource, determining, by the terminal, the procedure for obtaining a sidelink transmission resource according to the indication information of the network-side device; or
    when the indication information of the network-side device comprises a correspondence between QoS parameters and a procedure for obtaining a sidelink transmission resource, or comprises a correspondence between a QoS parameter combination and a procedure for obtaining a sidelink transmission resource, determining, by the terminal, the procedure for obtaining a sidelink transmission resource, according to QoS parameters or a QoS parameter combination corresponding to a logical channel with data transmission requirement of the sidelink, as well as the indication information of the network-side device; or
    when the indication information of the network-side device comprises thresholds of QoS parameters or a threshold of a QoS parameter combination corresponding to a procedure for obtaining a sidelink transmission resource, determining, by the terminal, the procedure for obtaining a sidelink transmission resource, according to QoS parameters or a QoS parameter combination corresponding to a logical channel with data transmission requirement of the sidelink, as well as the indication information of the network-side device.

6. The method of claim 5, further comprising: when the sidelink has a plurality of logical channels with data transmission requirements,
    determining, by the terminal, a logical channel with the highest priority as the logical channel with data transmission requirement.

7. The method of claim 3, before the terminal determines the procedure for obtaining a sidelink transmission resource according to the indication information of the network-side device, further comprising:
    receiving, by the terminal, the indication information of the network-side device through a target message; wherein
    when the terminal is in the RRC INACTIVE state, the target message is at least one of: Radio Resource Control Resume (RRC Resume) message; Master Information Block (MIB); System Information Block 1 (SIB1); Radio Access Network-level Paging (RAN-level Paging);
    when the terminal is in the RRC IDLE state, the target message is at least one of: MIB, SIB1, RAN-level Paging.

8. The method of claim 1, after the terminal initiates the system information request procedure, further comprising:
    when there is no available sidelink transmission resource in system information related to sidelink communication obtained by the terminal through the system information request procedure, obtaining, by the terminal, the sidelink transmission resource by initiating the RRC connection management related procedure.

9. A resource allocation method, the method comprising:
    responding to, by a network-side device, an RRC connection management related procedure or a system information request procedure initiated by a terminal, and wherein the RRC connection management related procedure or system information request procedure is initiated by the terminal, when a sidelink has a data transmission requirement and there is no available sidelink transmission resource;

allocating, by the network-side device, a sidelink transmission resource to the terminal through the RRC connection management related procedure or system information request procedure;

wherein whether there is no sidelink transmission resource is determined by:

determining whether previously-stored system information carrying a sidelink transmission resource is available, according to a system information area identifier and a system information validity identifier carried in a system information block 1 of a current cell, and:

when the previously-stored system information carrying the sidelink transmission resource is available, determining that there is a sidelink transmission resource; or when the previously-stored system information carrying the sidelink transmission resource is unavailable, determining that there is no sidelink transmission resource;

or determining whether previously-stored system information carrying a sidelink transmission resource is available, according to a system information area identifier and a system information validity identifier carried in a system information block 1 of a current cell, and:

when the previously-stored system information carrying the sidelink transmission resource is available, determining that there is a sidelink transmission resource; or when the previously-stored system information carrying the sidelink transmission resource is unavailable, reading a currently-broadcast system information, and:

when there is system information that is being broadcast and carries a sidelink transmission resource, determining that there is a sidelink transmission resource; or when there is no system information that is being broadcast and carries a sidelink transmission resource, determining that there is no sidelink transmission resource;

or reading a currently-broadcast system information, and:

when there is no system information that is being broadcast and carries a sidelink transmission resource, determining whether previously-stored system information carrying a sidelink transmission resource is available, according to a system information area identifier and a system information validity identifier carried in a system information block 1 of a current cell; and:

when the previously-stored system information carrying a sidelink transmission resource is available, determining that there is a sidelink transmission resource; or when the previously-stored system information carrying a sidelink transmission resource is unavailable, determining that there is no sidelink transmission resource.

10. The method of claim 9, before the network-side device responds to the RRC connection management related procedure or system information request procedure initiated by the terminal, further comprising:

notifying, by the network-side device, the terminal of the procedure for obtaining a sidelink transmission resource through indication information;

wherein the procedure for obtaining a sidelink transmission resource is the RRC connection management related procedure or system information request procedure; and when the terminal is in the RRC INACTIVE state, the RRC connection management related procedure performed by the network-side device and terminal is an RRC connection resume procedure; or when the terminal is in the RRC IDLE state, the RRC connection management related procedure performed by the network-side device and terminal is an RRC connection establishment procedure.

11. The method of claim 10, wherein:

the indication information indicates that system information related to sidelink communication of a current cell contains indication information of a sidelink transmission resource pool, or indicates that system information related to sidelink communication of a current cell does not contain indication information of a sidelink transmission resource pool; or the indication information indicates a procedure to be initiated by the terminal for obtaining a sidelink transmission resource; or the indication information comprises a correspondence between QoS parameters and a procedure for obtaining a sidelink transmission resource, or comprises a correspondence between a QoS parameter combination and a procedure for obtaining a sidelink transmission resource; or the indication information comprises thresholds of QoS parameters or a threshold of a QoS parameter combination corresponding to a procedure for obtaining a sidelink transmission resource.

12. The method of claim 10, wherein the notifying, by the network-side device, the terminal of the procedure for obtaining a sidelink transmission resource through the indication information, comprises:

sending, by the network-side device, the indication information through a target message; wherein when the terminal is in the RRC INACTIVE state, the target message is at least one of RRC Resume message, MIB, SIB1, RAN-level Paging;

when the terminal is in the RRC IDLE state, the target message is at least one of: MIB, SIB1, RAN-level Paging.

13. A resource allocation device, the device comprising: a processor, a memory and a transceiver;

wherein the processor is configured to read a program in the memory and perform:

determining whether there is a sidelink transmission resource when a sidelink has a data transmission requirement; and obtaining a sidelink transmission resource by initiating an RRC connection management related procedure or a system information request procedure, when there is no sidelink transmission resource;

wherein the processor is further configured to:

determine whether previously-stored system information carrying a sidelink transmission resource is available, according to a system information area identifier and a system information validity identifier carried in a system information block 1 of a current cell, and:

when the previously-stored system information carrying the sidelink transmission resource is available, determine that there is a sidelink transmission resource; or when the previously-stored system information carrying the sidelink transmission resource is unavailable, determine that there is no sidelink transmission resource;

or determine whether previously-stored system information carrying a sidelink transmission resource is available, according to a system information area identifier and a system information validity identifier carried in a system information block 1 of a current cell, and:

when the previously-stored system information carrying the sidelink transmission resource is available, determine that there is a sidelink transmission resource; or
when the previously-stored system information carrying the sidelink transmission resource is unavailable, read a currently-broadcast system information, and:
when there is system information that is being broadcast and carries a sidelink transmission resource, determine that there is a sidelink transmission resource; or
when there is no system information that is being broadcast and carries a sidelink transmission resource, determine that there is no sidelink transmission resource;
or read a currently-broadcast system information, and:
when there is no system information that is being broadcast and carries a sidelink transmission resource, determine whether previously-stored system information carrying a sidelink transmission resource is available according to a system information area identifier and a system information validity identifier carried in a system information block 1 of a current cell; and:
when the previously-stored system information carrying a sidelink transmission resource is available, determine that there is a sidelink transmission resource; or
when the previously-stored system information carrying a sidelink transmission resource is unavailable, determine that there is no sidelink transmission resource.

14. The device of claim 13, wherein the device is a terminal in an RRC IDLE state or a terminal in an RRC INACTIVE state; and
when the device is a terminal in the RRC INACTIVE state, the initiated RRC connection management related procedure is an RRC connection resume procedure; or
when the device is a terminal in the RRC IDLE state, the initiated RRC connection management related procedure is an RRC connection establishment procedure.

15. The device of claim 13, wherein the processor is further configured to:
determine a procedure for obtaining a sidelink transmission resource according to protocol; or
determine a procedure for obtaining a sidelink transmission resource according to its own implementation; or
determine a procedure for obtaining a sidelink transmission resource according to indication information of a network-side device;
wherein the procedure for obtaining a sidelink transmission resource is the RRC connection management related procedure or system information request procedure.

16. A resource allocation device, the device comprising: a processor, a memory and a transceiver;
wherein the processor is configured to read a program in the memory and perform:
responding to an RRC connection management related procedure or a system information request procedure initiated by a terminal, and
wherein the RRC connection management related procedure or system information request procedure is initiated by the terminal when a sidelink has a data transmission requirement and there is no available sidelink transmission resource; and
allocating a sidelink transmission resource to the terminal through the RRC connection management related procedure or system information request procedure;
wherein whether there is no sidelink transmission resource is determined by:
determining whether previously-stored system information carrying a sidelink transmission resource is available, according to a system information area identifier and a system information validity identifier carried in a system information block 1 of a current cell, and:
when the previously-stored system information carrying the sidelink transmission resource is available, determining that there is a sidelink transmission resource; or
when the previously-stored system information carrying the sidelink transmission resource is unavailable, determining that there is no sidelink transmission resource;
or determining whether previously-stored system information carrying a sidelink transmission resource is available, according to a system information area identifier and a system information validity identifier carried in a system information block 1 of a current cell, and:
when the previously-stored system information carrying the sidelink transmission resource is available, determining that there is a sidelink transmission resource; or
when the previously-stored system information carrying the sidelink transmission resource is unavailable, reading a currently-broadcast system information, and:
when there is system information that is being broadcast and carries a sidelink transmission resource, determining that there is a sidelink transmission resource; or
when there is no system information that is being broadcast and carries a sidelink transmission resource, determining that there is no sidelink transmission resource;
or reading a currently-broadcast system information, and:
when there is no system information that is being broadcast and carries a sidelink transmission resource, determining whether previously-stored system information carrying a sidelink transmission resource is available, according to a system information area identifier and a system information validity identifier carried in a system information block 1 of a current cell; and:
when the previously-stored system information carrying a sidelink transmission resource is available, determining that there is a sidelink transmission resource; or
when the previously-stored system information carrying a sidelink transmission resource is unavailable, determining that there is no sidelink transmission resource.

17. The device of claim 16, wherein the processor is further configured to:
notify the terminal of the procedure for obtaining a sidelink transmission resource through indication information;
wherein the procedure for obtaining a sidelink transmission resource is the RRC connection management related procedure or system information request procedure; and
when the terminal is in the RRC INACTIVE state, the RRC connection management related procedure performed by the processor and terminal is an RRC connection resume procedure; or
when the terminal is in the RRC IDLE state, the RRC connection management related procedure performed by the processor and terminal is an RRC connection establishment procedure.

18. The device of claim 17, wherein:
the indication information indicates that system information related to sidelink communication of a current cell contains indication information of a sidelink transmission resource pool, or indicates that system information related to sidelink communication of a current cell does not contain indication information of a sidelink transmission resource pool; or the indication information indicates a procedure to be initiated by the terminal for obtaining a sidelink transmission resource; or the indication information comprises a correspondence between QoS parameters and the procedure for obtaining a sidelink transmission resource, or comprises a correspondence between a QoS parameter combination and a procedure for obtaining a sidelink transmission resource; or the indication information comprises thresholds of QoS parameters or a threshold of a QoS parameter combination corresponding to a procedure for obtaining a sidelink transmission resource.

* * * * *

UNITED STATES PATENT AND TRADEMARK OFFICE
CERTIFICATE OF CORRECTION

| | |
|---|---|
| PATENT NO. | : 12,075,509 B2 |
| APPLICATION NO. | : 17/264287 |
| DATED | : August 27, 2024 |
| INVENTOR(S) | : Yali Zhao |

It is certified that error appears in the above-identified patent and that said Letters Patent is hereby corrected as shown below:

On the Title Page

Item (30), Foreign Application Priority Data, please add "1" between "2018" and "0934936"

Signed and Sealed this
Fifth Day of November, 2024

Katherine Kelly Vidal
*Director of the United States Patent and Trademark Office*